United States Patent
Miyamoto

(10) Patent No.: US 8,773,460 B2
(45) Date of Patent: Jul. 8, 2014

(54) INFORMATION PROCESSING APPARATUS, INFORMATION PROCESSING METHOD, AND INFORMATION PROCESSING PROGRAM FOR DISPLAYING A PLURALITY OF OBJECTS ON AN OPERATION SCREEN BASED ON A DRAWING ORDER OF THE PLURITY OF OBJECTS

(75) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 11/754,921

(22) Filed: May 29, 2007

(65) Prior Publication Data

US 2007/0291308 A1 Dec. 20, 2007

(30) Foreign Application Priority Data

Jun. 6, 2006 (JP) ................................. 2006-157469

(51) Int. Cl.
*G09G 5/00* (2006.01)

(52) U.S. Cl.
USPC ............ 345/629; 715/794; 715/766; 345/672

(58) Field of Classification Search
CPC .............................. G06F 3/048; G06F 3/0484
USPC ............................ 345/629, 766; 715/794, 766
See application file for complete search history.

(56) References Cited

U.S. PATENT DOCUMENTS

| | | | | |
|---|---|---|---|---|
| 4,761,642 A | * | 8/1988 | Huntzinger | 715/806 |
| 4,819,189 A | * | 4/1989 | Kikuchi et al. | 715/797 |
| 5,487,143 A | * | 1/1996 | Southgate | 715/790 |
| 6,077,161 A | * | 6/2000 | Wisler | 463/11 |
| 2002/0171683 A1 | * | 11/2002 | Meaden | 345/794 |
| 2003/0189602 A1 | * | 10/2003 | Dalton et al. | 345/830 |
| 2004/0261039 A1 | * | 12/2004 | Pagan | 715/797 |

FOREIGN PATENT DOCUMENTS

| | | |
|---|---|---|
| JP | 07-152356 A | 6/1995 |
| JP | 09-016368 A | 1/1997 |

OTHER PUBLICATIONS

Haraken, Joe, "Microsoft Office 2003 All in One", Que Publishing, Oct. 22, 2003, p. 761-767.*

* cited by examiner

*Primary Examiner* — Michelle L Sams
(74) *Attorney, Agent, or Firm* — Canon USA, Inc., IP Division

(57) ABSTRACT

An information processing apparatus includes a first selection unit configured to select a first object from a plurality of objects displayed on an operation screen, a second selection unit configured to select a second object which is an object different from the first object and is used as a reference when the drawing order of the first object is changed, a drawing order determination unit configured to determine whether the first object is drawn in front of the second object when the first and second objects are drawn according to the drawing order of the plurality of objects, and a drawing order changing unit configured to change the drawing order of the plurality of objects so that the first object is drawn behind the second object if the drawing order determination unit determines that the first object is drawn in front of the second object.

12 Claims, 39 Drawing Sheets

FIG.4

| NO | ATTRIBUTE INFORMATION | | NOTE |
|---|---|---|---|
| 1 | PRINT METHOD | ONE-SIDED/ TWO-SIDED/ BOOKBINDING PRINT | |
| 2 | SHEET SIZE | DOCUMENT SIZE/ FIXED SIZE | · DESIGNATE Z-FOLDING WHEN "A4+A3", "B4+B3", AND "LETTER+LEISURE(11×17)" IS DESIGNATED<br>· "AUTOMATICALLY SELECT DOCUMENT SIZE OF CHAPTER 1/PAGE 1 WHEN BOOKBINDING PRINT OR N-UP PRINT IS DESIGNATED |
| 3 | SHEET ORIENTATION | PORTRAIT/ LANDSCAPE | · SELECTABLE ONLY FOR FIXED SIZE |
| 4 | BINDING GUTTER/ BINDING DIRECTION | | · SHIFT/ENLARGE-REDUCE DESIGNATION IS FEASIBLE |
| 5 | N-UP PRINT DESIGNATION | PAGE NUMBER/ PLACEMENT ORDER/ BORDER LINE/ PLACEMENT POSITION | · 9 PATTERNS ARE AVAILABLE IN PLACEMENT POSITION<br>· DIRECT PRINT DESIGNATION IS FEASIBLE |
| 6 | ENLARGE/ REDUCE | ON/OFF | · AUTOMATICALLY DESIGNATE ON OR OFF WHEN FIXED SIZE OR N-UP PRINT IS SELECTED |
| 7 | WATERMARK | | · CAN BE INDEPENDENTLY DESIGNATED FOR EACH LOGICAL PAGE AND PHYSICAL PAGE<br>· APPLICABLE TO ALL CHAPTERS/ALL PAGES |
| 8 | HEADER/ FOOTER | | · CAN BE INDEPENDENTLY DESIGNATED FOR EACH LOGICAL PAGE AND PHYSICAL PAGE<br>· APPLICABLE TO ALL CHAPTERS/ALL PAGES |
| 9 | SHEET DISCHARGE METHOD | STAPLE/ PUNCH HOLE | · STAPLE/PUNCH IS AVAILABLE FOR ONE-SIDED/TWO-SIDED PRINTING<br>· STAPLE IS 1 PORTION OR 2 PORTIONS |
| 10 | DETAILS OF BOOKBINDING | OPENING DIRECTION/ SADDLE STITCH/ ENLARGE-REDUCE DESIGNATION/ BINDING MARGIN/ SEPARATE VOLUME | · ONLY AVAILABLE FOR BOOKBINDING PRINT |
| 11 | FRONT COVER/ BACK COVER | | · DESIGNATE PRINTING OF FRONT COVER 1/2 AND BACK COVER 1/2<br>· DESIGNATE SHEET FEED PORT (INCLUDING INSERTER) |
| 12 | INDEX SHEET | | · CHARACTER STRING PRINTING TO INDEX PORTION AND ANNOTATION ON INDEX SHEET ARE SETTABLE<br>· CANNOT BE DESIGNATED FOR BOOKBINDING PRINT |
| 13 | INTERLEAF | | · DESIGNATE SHEET FEED PORT (INCLUDING INSERTER)<br>· DOCUMENT DATA CAN BE PRINTED ON INSERTED SHEET<br>· CANNOT BE DESIGNATED FOR BOOKBINDING PRINT |
| 14 | CHAPTER BREAK | "NO BREAK"/ "PAGE BREAK"/ "SHEET BREAK" | · FIXED TO "SHEET BREAK" WHEN INDEX SHEET OR INTERLEAF IS DESIGNATED<br>· FIXED TO "SHEET BREAK" FOR ONE-SIDED PRINTING |

FIG.5

| NO | ATTRIBUTE INFORMATION | | NOTE |
|---|---|---|---|
| 1 | SHEET SIZE | DOCUMENT SIZE/ FIXED SIZE | · AUTOMATICALLY DESIGNATE "SHEET BREAK" WHEN FIXED SIZE IS SELECTED<br>· CHANGEABLE FOR ONLY DESIGNATED SHEET WHEN PLURAL SHEETS ARE SELECTED IN BOOK, AND CHANGE OF SHEET SIZE IS FEASIBLE FOR DESIGNATION OF BOOK ADJUSTMENT |
| 2 | SHEET ORIENTATION | PORTRAIT/ LANDSCAPE | · SELECTABLE ONLY FOR FIXED SIZE |
| 3 | N-UP PRINT DESIGNATION | PAGE NUMBER/ PLACEMENT ORDER/ BORDER LINE/ PLACEMENT POSITION | · 9 PATTERNS ARE AVAILABLE IN PLACEMENT POSITION<br>· DIRECT PRINT DESIGNATION IS FEASIBLE |
| 4 | ENLARGE/ REDUCE | ON/OFF | · AUTOMATICALLY DESIGNATE ON OR OFF WHEN FIXED SIZE OR N-UP PRINT IS SELECTED |
| 5 | WATERMARK | DISPLAY/ NON-DISPLAY | · DETERMINE WHETHER ALL WATERMARKS DESIGNATED BY BOOK ARE DISPLAYED |
| 6 | HEADER/ FOOTER | DISPLAY/ NON-DISPLAY | · DETERMINE WHETHER ALL HEADERS/FOOTERS DESIGNATED BY BOOK ARE DISPLAYED |
| 7 | SHEET DISCHARGE METHOD | STAPLE | · "OFF" IS SELECTABLE WHEN STAPLE IS DESIGNATED BY BOOK.<br>DEFAULT SETTING IS "ON" |

FIG.6

| NO | ATTRIBUTE INFORMATION | | NOTE |
|---|---|---|---|
| 1 | PAGE ROTATION DESIGNATION | | · SELECTABLE FROM 0/90/180/270 DEGREES |
| 2 | WATERMARK | DISPLAY/ NON-DISPLAY | · DETERMINE WHETHER ALL WATERMARKS DESIGNATED BY BOOK ARE DISPLAYED |
| 3 | HEADER/ FOOTER | DISPLAY/ NON-DISPLAY | · DETERMINE WHETHER ALL HEADERS/FOOTERS DESIGNATED BY BOOK ARE DISPLAYED |
| 4 | ZOOM | 50% - 200% | · DESIGNATE RELATIVE MAGNIFICATION WHEN 100% SIZE IS EQUAL TO VIRTUAL LOGICAL PAGE REGION |
| 5 | PLACEMENT DESIGNATION | | · SELECT ONE OF NINE FIXED PATTERNS OR ARBITRARY POSITION |
| 6 | ANNOTATION | | |
| 7 | VARIABLE ITEM | | |
| 8 | PAGE DIVISION | | |

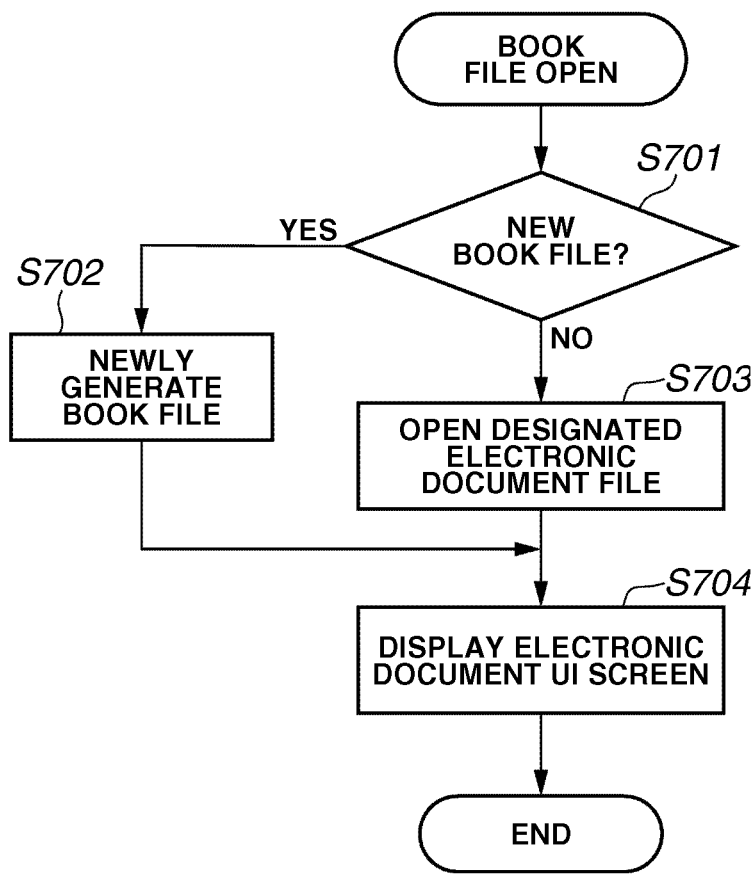

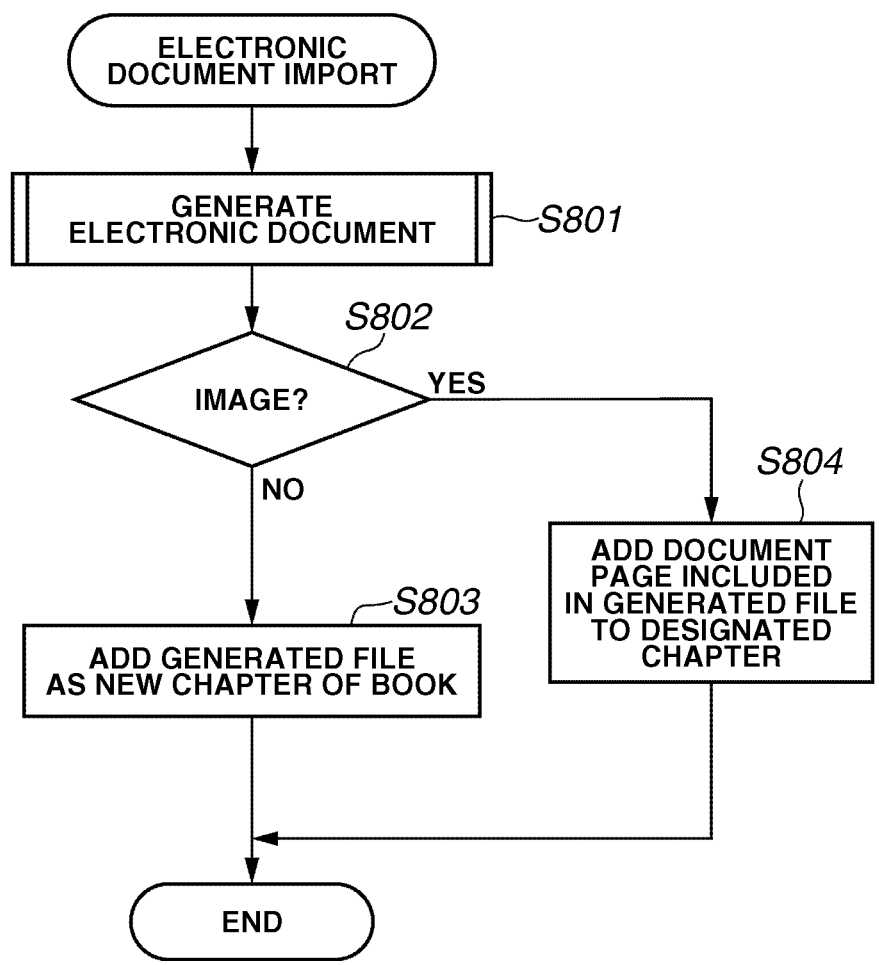

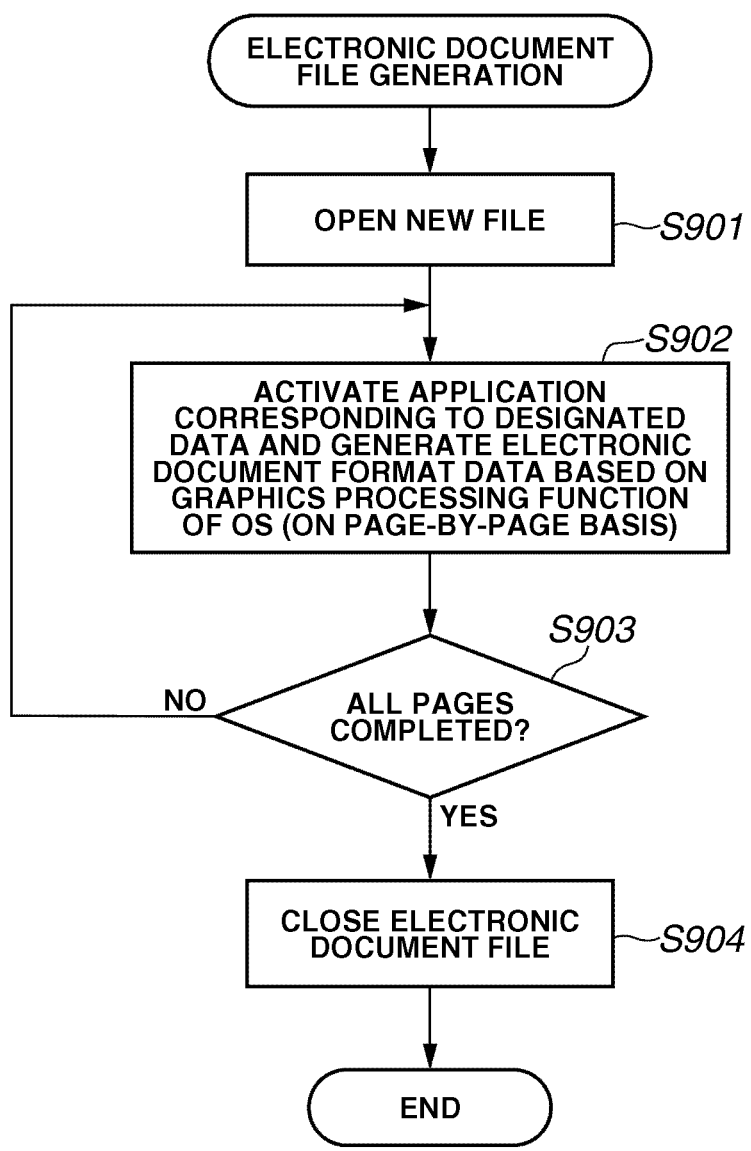

FIG.19
· MENU ENABLING SWITCHING OF MODE
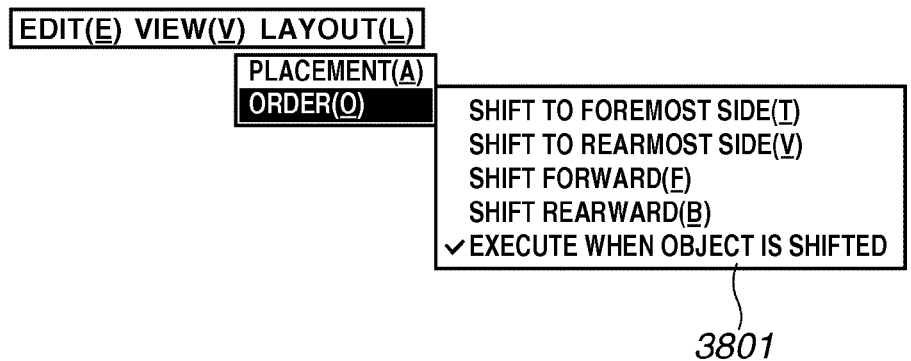
3801
· TOOLBAR ENABLING SWITCHING OF MODE
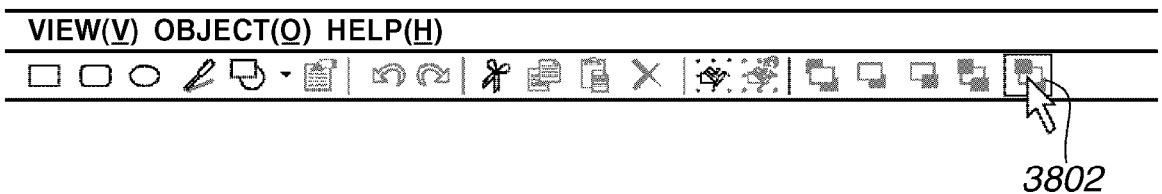
3802

FIG.29A
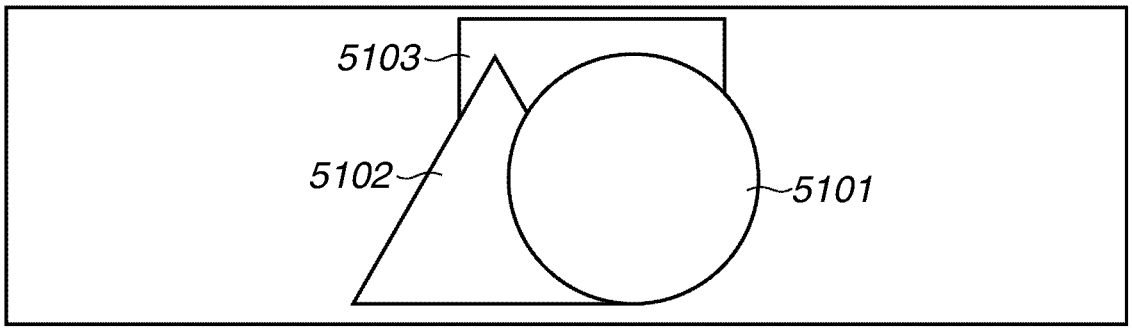
FIG.29B
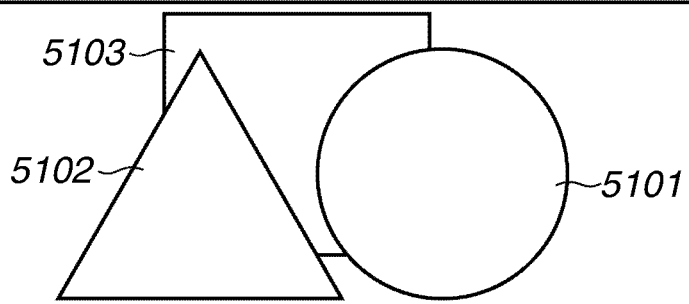
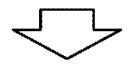
FIG.29C
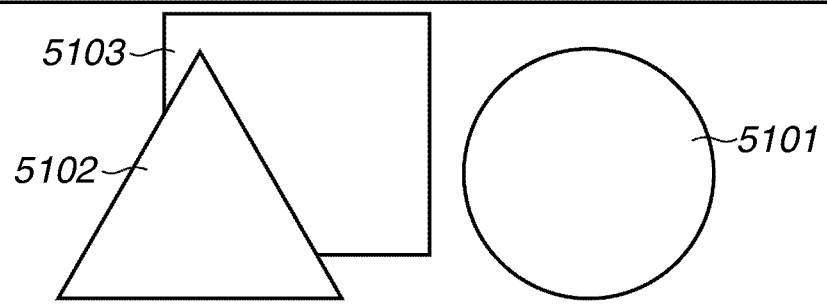
FIG.29D
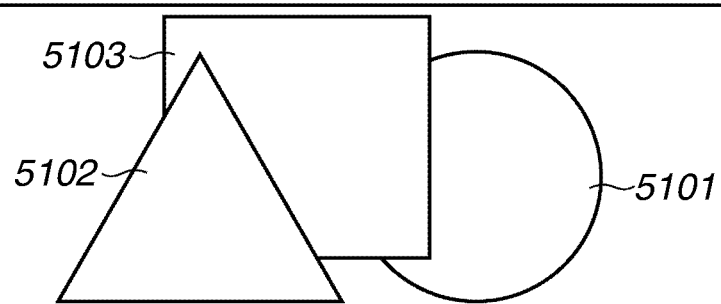

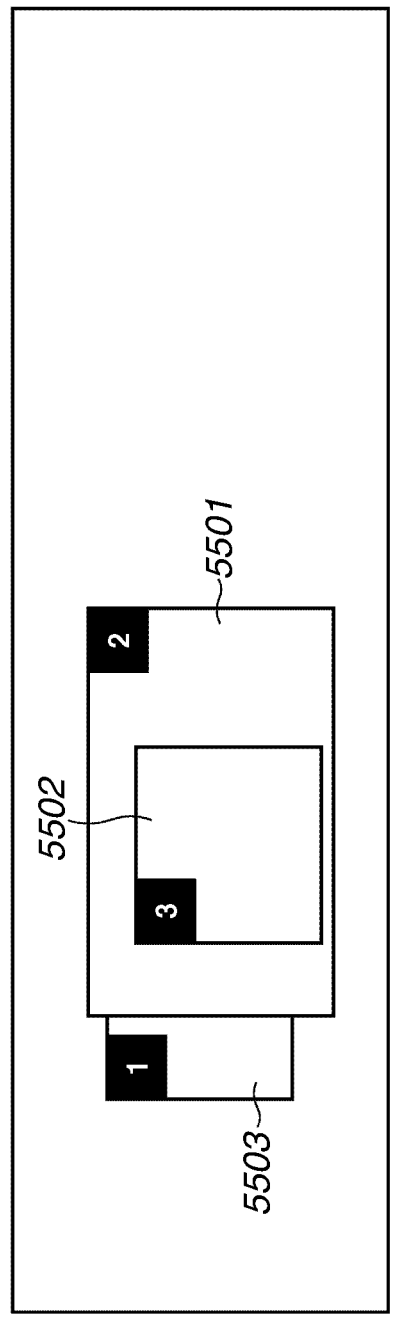

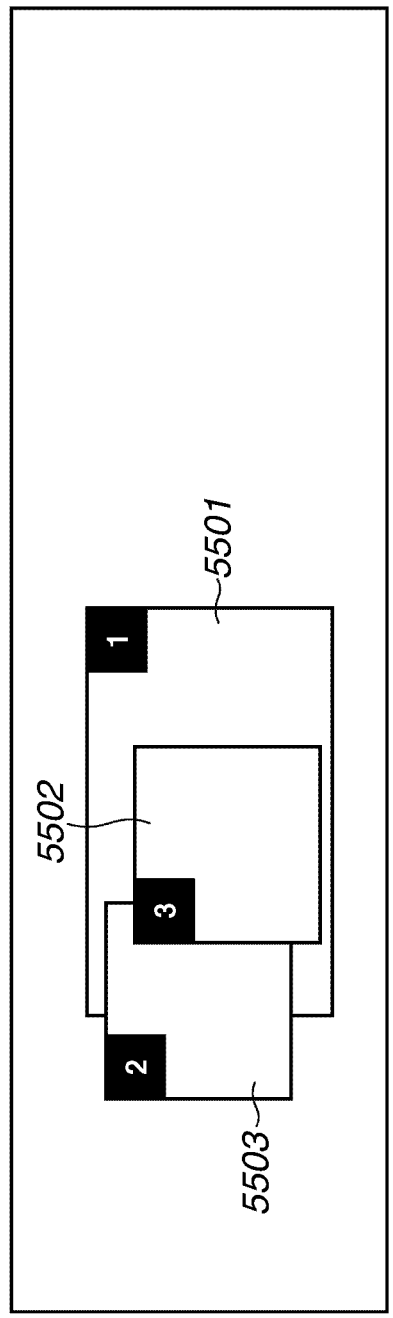

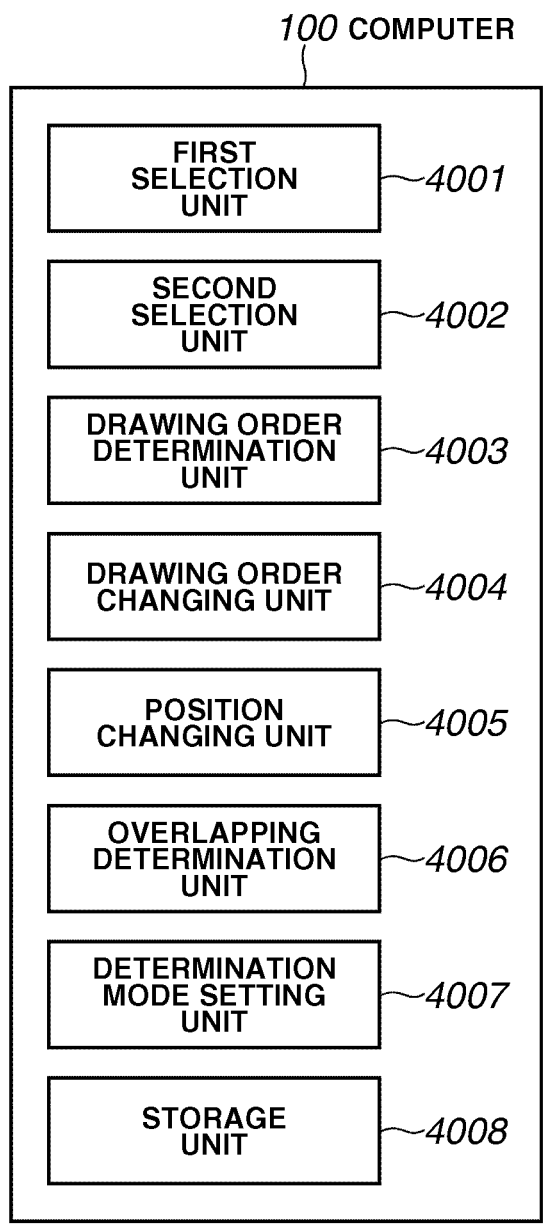

INFORMATION PROCESSING APPARATUS, INFORMATION PROCESSING METHOD, AND INFORMATION PROCESSING PROGRAM FOR DISPLAYING A PLURALITY OF OBJECTS ON AN OPERATION SCREEN BASED ON A DRAWING ORDER OF THE PLURITY OF OBJECTS

BACKGROUND OF THE INVENTION

1. Field of the Invention

The present invention relates to an information processing apparatus capable of outputting a plurality of objects according to a drawing order allocated to each object.

2. Description of the Related Art

An application executable by a computer generates various contents including graphics and text objects according to the order of each object in a depth direction (hereinafter, refer to as "drawing order", "depth position information" or "z-order"). The application can express overlapping of respective objects with reference to the drawing order allocated to each object.

A conventional technique for changing the drawing order of each object generates an instruction such as "shift forward" or "shift rearward" to change an overlapping state of objects. This method can switch a positional relationship between an operation target object and a neighboring object (i.e., an object having a drawing order greater or less by "1" than the operation target object). However, this method has the following problem.

An example illustrated in FIG. 17 includes a plurality of objects 3401 through 3419 which are drawn in order of the number assigned to each object. More specifically, the object 3401 is disposed at a rearmost side (on a bottom layer) and the object 3419 is disposed at a foremost side (on a top layer). In this state, if a new object 3501 is added, the object 3501 is disposed in front of the object 3419 according to the drawing order assigned to the object 3501.

In FIG. 17, a user may regard the object 3501 as being drawn in front of the object 3412. Therefore, if a user intends to draw the object 3501 between the objects 3411 and 3412, the user generates an instruction "shift rearward" to move the object 3501. However, other objects (i.e., objects 3413 through 3419) are present between the objects 3501 and 3412. Thus, the user is required to repeatedly generate the instruction "shift rearward."

Furthermore, in a situation illustrated in FIG. 17, even if a user has once generated an instruction "shift rearward", a target object does not change in appearance although the drawing order of the target object has changed. Thus, a user cannot determine whether the operation was successful.

To solve the problem, a conventional technique discussed in Japanese Patent Application Laid-Open No. 07-152356 specifies an object group overlapping a selected object. Then, an overlapping relationship can be switched in such a manner that the selected object can be switched with an object having a closest overlapping order in the specified object group.

Furthermore, as a method for changing the overlapping order of a plurality of objects, a conventional technique discussed in Japanese Patent Application Laid-Open No. 09-016368 stores a selection order of an object and changes the overlapping of respective objects according to the stored selection order.

However, according to the technique discussed in Japanese Patent Application Laid-Open No. 07-152356, the object being switched with the selected object in overlapping position is an object having been set a closest overlapping order.

As a result, if a great number of objects are present between the selected object and the object having been set a desired overlapping order, a user is required to repeatedly execute the overlapping change processing.

Furthermore, according to the technique discussed in Japanese Patent Application Laid-Open No. 09-016368, when a user changes an overlapping relationship, the user is required to select an object according to a desired overlapping order. Therefore, if a great number of objects are present, the user repeatedly executes the selection processing by an amount corresponding to the total number of objects.

Therefore, in any of the above-described conventional techniques, a user cannot easily change the drawing order of a plurality of objects so as to realize a desired overlapping relationship.

SUMMARY OF THE INVENTION

Exemplary embodiments of the present invention are directed to an information processing apparatus which is capable of changing the drawing order of an object selected by a user.

According to an aspect of the present invention, an information processing apparatus configured to display a plurality of objects on an operation screen according to a drawing order of the plurality of objects includes a first selection unit configured to select a first object from the plurality of objects displayed on the operation screen, a second selection unit configured to select a second object which is an object different from the first object selected by the first selection unit and is used as a reference when the drawing order of the first object is changed, a drawing order determination unit configured to determine whether the first object is drawn in front of the second object when the first and second objects are drawn according to the drawing order of the plurality of objects, and a drawing order changing unit configured to change the drawing order of the plurality of objects so that the first object is drawn behind the second object if the drawing order determination unit determines that the first object is drawn in front of the second object.

According to another aspect of the present invention, an information processing apparatus configured to display a plurality of objects on an operation screen according to a drawing order of the plurality of objects, includes a first selection unit configured to select a first object from the plurality of objects displayed on the operation screen, a second selection unit configured to select a second object which is an object different from the first object selected by the first selection unit and is used as a reference when the drawing order of the first object is changed, a drawing order determination unit configured to determine whether the first object is drawn behind the second object when the first and second objects are drawn according to the drawing order of the plurality of objects, and a drawing order changing unit configured to change the drawing order of the plurality of objects so that the first object is drawn in front of the second object if the drawing order determination unit determines that the first object is drawn behind the second object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an exemplary list of book attributes.

FIG. 5 illustrates an exemplary list of chapter attributes.

FIG. 6 illustrates an exemplary list of page attributes.

FIG. 7 is a flowchart illustrating an exemplary procedure for opening a book file.

FIG. 8 is a flowchart illustrating an exemplary procedure for importing an electronic document file to a book file.

FIG. 9 is a flowchart illustrating a detailed procedure for converting application data into an electronic document file.

FIG. 19 illustrates exemplary UI screens which enable a user to select a depth change mode in the object shifting operation.

FIGS. 29A through 29D illustrate exemplary UI screens displayed in the object shift processing.

FIG. 33 is a UI screen illustrating an exemplary state resulting from the operation of FIGS. 32A and 32B performed according to an ordinary determination mode.

FIG. 34 is a UI screen illustrating an exemplary state resulting from the operation of FIGS. 32A and 32B performed according to a continuous determination mode.

FIG. 40 is a block diagram illustrating an information processing apparatus according to an exemplary embodiment of the present invention.

DETAILED DESCRIPTION OF THE EMBODIMENTS

Figure 1:
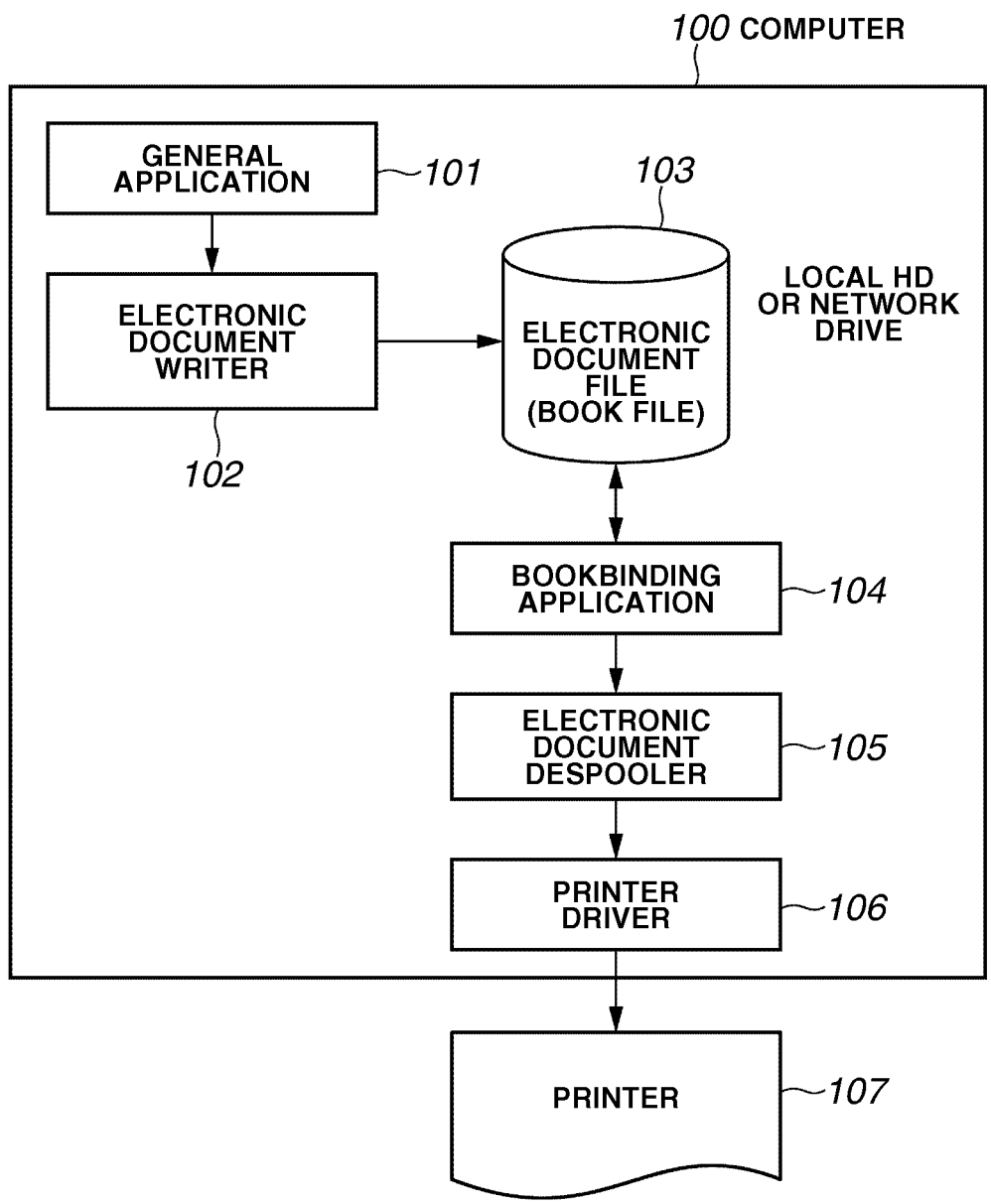
FIG. 1 is a block diagram illustrating an exemplary software arrangement of a stand-alone type document processing system according to an exemplary embodiment of the present invention.

The following description of exemplary embodiments is illustrative in nature and is in no way intended to limit the invention, its application, or uses.

Processes, techniques, apparatus, and systems as known by one of ordinary skill in the art are intended to be part of the enabling description where appropriate.

For example, certain circuitry for image processing, data processing, and related systems/methods as known by one of ordinary skill in the relevant art is intended to be part of the enabling disclosure herein where appropriate.

It is noted that throughout the specification, similar reference numerals and letters refer to similar items in the following figures, and thus once an item is described in one figure, it may not be discussed for following figures.

Hereinafter, exemplary embodiments according to the present invention will be described with reference to attached drawings.

<Overview of System>

First, a document processing system according to an exemplary embodiment of the present invention is described with reference to FIGS. 1 through 12. The document processing system includes an electronic document writer that can convert a data file generated by a general application into an electronic document file and a bookbinding application that enables a user to edit the electronic document file. The bookbinding application can generate and edit a document including a plurality of data generated by the general application, improve the operability, and effectively perform document edit processing.

<System Arrangement and Operation>

FIG. 1 illustrates an exemplary document processing system according to an exemplary embodiment. The document processing system illustrated in FIG. 1 includes a digital computer 100 (hereinafter, referred to as a "host computer") that is capable of functioning as an information processing apparatus. The digital computer 100 includes a general application 101 that provides various functions, such as word processing, photo retouch, paint, presentation, and text edit.

The general application 101 has a print function for an operating system (OS). When a user instructs printing of generated application data (i.e., document data, image data, etc.), the general application 101 uses a predetermined interface (generally, referred to as "GDI") provided by the OS. Namely, to print generated data, the general application 101 transmits an output command (referred to as a "GDI function") having an OS-dependent format to an output module of the OS that provides the above-described interface.

On the other hand, the output module receives an output command and converts the received output command into data having a format that can be processed by a printer or other output device. The output module outputs a converted command (referred to as a "DDI function"). The format processable by the output device is dependent on the type of each device, a manufacturer, a machine model, etc.

Therefore, a device driver of each device provides the format. The device driver generates print data based on application data and generates a print job based on a job language (JL). When the OS is Windows® provided by Microsoft Corporation, the above-described output module is referred to as Graphic Device Interface (GDI).

An electronic document writer 102, corresponding to an improved device driver, is a software module which is capable of realizing a document processing system according to the present embodiment. The electronic document writer 102 is not a specific output device and can convert data into an output command having a predetermined format so that a bookbinding application 104 or a printer driver 106 can process the output command.

The converted format obtained by the electronic document writer 102 (hereinafter, referred to as an "electronic document format") can be any format that can express document data on a page-by-page basis. For example, a Portable Document Format (PDF) provided by Adobe Systems or a Scalable Vector Graphics (SVG) format can be used as a standard electronic document format.

When a user operates the electronic document writer 102 through the general application 101, the system designates the electronic document writer 102 as an output device driver. In general, an electronic document file generated by the electronic document writer 102 does not have a perfect format as an electronic document file. Therefore, the bookbinding application 104 designates the electronic document writer 102 as a device driver.

The bookbinding application 104 manages the conversion of application data into an electronic document file. Then, the bookbinding application 104 completes an electronic document file so as to have a later-described format based on an incomplete electronic document file newly generated by the electronic document writer 102.

In the following description, to explicitly express the above-described features, a file generated by the electronic document writer 102 may be referred to as an "electronic document file" while an electronic document file having been completed by the bookbinding application 104 may be referred to as a "book file."

Furthermore, if it is unnecessary to specifically discriminate the files, any document file, any electronic document file, and any book file generated by an application may be simply referred to as a "document file (or document data)."

As described above, when the electronic document writer 102 is designated as a device driver and the general application 101 generates print data, application data can be converted into an electronic document format including pages defined by the general application 101.

Then, the application data can be stored as an electronic document file 103 into a hard disk or other storage medium. In the following description, a page defined by an application is referred to as a "logical page" or "document page." The hard disk can be a local drive of a computer that realizes the document processing system of the present embodiment, or can be a network drive provided on a network.

The bookbinding application 104 reads the electronic document file (or book file) 103 and enables a user to edit the read file. However, the bookbinding application 104 does not provide a function for editing the contents of each page. The bookbinding application 104 enables a user to edit the structure of a book including chapters on a page-by-page basis.

When a user instructs printing of a book file 103 edited by the bookbinding application 104, the bookbinding application 104 activates an electronic document despooler 105. The electronic document despooler 105 is a program module installed together with the bookbinding application 104 on the computer 100. The electronic document despooler 105 is a module capable of outputting drawing data to a printer driver when a document (book file) used by the bookbinding application 104 is printed.

The electronic document despooler 105 reads a designated book file from the hard disk, and generates an output command adaptable to the above-described output module of the OS so as to print each page according to a format described in the book file. The electronic document despooler 105 outputs the generated command to the output module (not illustrated). In this case, the electronic document despooler 105 designates the printer driver 106 as a device driver for a printer 107 used as an output device.

The above-described output module converts the received output command into a device command and outputs the device command to the printer driver 106 for the designated printer 107. The printer driver 106 converts the received command into page description language that the printer 107 can interpret. Then, the printer driver 106 transmits the converted command (page description language) to the printer 107 via a system spooler (not illustrated). The printer 107 prints an image based on the command.

Figure 2:
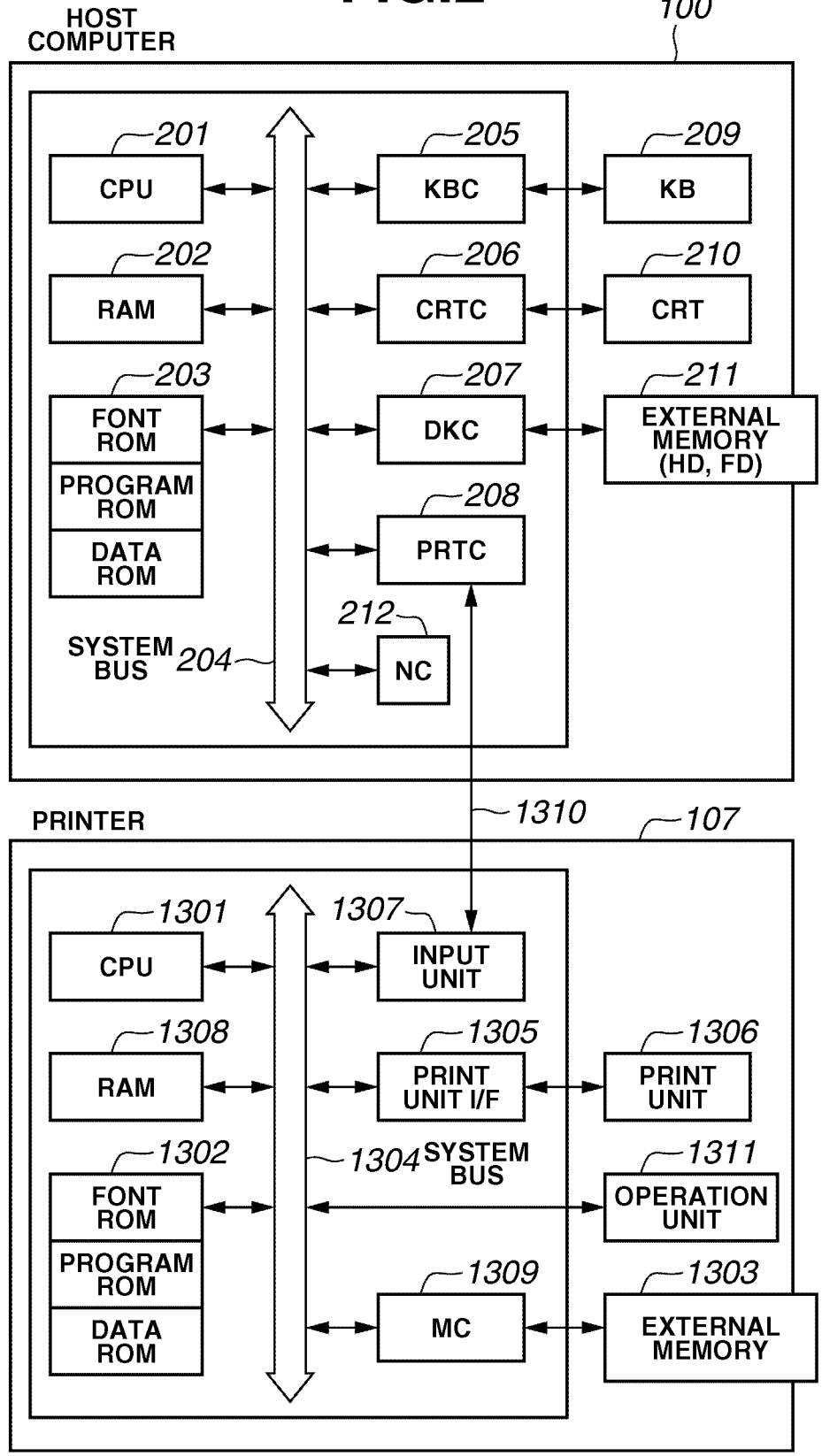
FIG. 2 is a block diagram illustrating an exemplary hardware arrangement that realizes the document processing system according to an exemplary embodiment.

FIG. 2 is a block diagram illustrating an exemplary hardware arrangement of the computer 100 and the printer 107 connected to the computer 100. In FIG. 2, a central processing unit (CPU) 201 executes various programs, including an OS, general applications, and a bookbinding application, which may be loaded to a random access memory (RAM) 202 from a read-only memory (ROM) 203 (a program ROM) or a hard disk 211. Furthermore, the CPU 201 can realize the software arrangement illustrated in FIG. 1 and the processing of a later-described flowchart.

The RAM 202 is capable of functioning as a main memory and a work area for the CPU 201. A keyboard controller (KBC) 205 controls any key input entered through a keyboard 209 or a pointing device (not illustrated). A CRT controller (CRTC) 206 controls a display of a cathode ray tube (CRT) display 210. A disk controller (DKC) 207 controls any access to the hard disk (HD) 211 or a floppy disk (FD), which can store a boot program, various applications, font data, user files, and later-described edit files. A printer controller (PRTC) 208 controls signals sent to or received from the connected the printer 107. A network controller (NC) 212, connected to a network, executes communication control processing when the host computer 100 communicates with other devices connected to the network. The above-described components are connected to each other via a system bus 204.

The printer 107 according to the present embodiment can be arranged by a single device, a system including a plurality of devices, or a network system including devices connected via a local area network (LAN) or wide area network (WAN), which can realize the functions of the present invention.

The printer 107 includes a printer CPU 1301. The CPU 1301 executes a control program stored in a ROM 1302 (program ROM) or an external memory 1303 and outputs an image signal (output information) to a print unit (printer engine) 1306 via a print unit interface (I/F) 1305 connected to a system bus 1304. The ROM 1302 has a region (i.e., program ROM) that stores the control program executed by the CPU 1301 and a region (i.e., font ROM) that stores font data used when the CPU 1301 generates the output information. Furthermore, the ROM 1302 has a region (i.e., data ROM) that stores information used on the host computer 100 when the printer 107 cannot use a hard disk or other external memory 1303.

Furthermore, the CPU 1301 can communicate with the host computer 100 via an input unit 1307 to transmit information of the printer 107 to the host computer 100. The printer 107 includes a RAM 1308 that functions as a main memory or a work area for the CPU 1301. The printer 107 has an expansion port (not illustrated) to which an optional RAM can be connected to increase the memory capacity. The RAM 1308 can be used as an output information expansion area, an environmental data storage area, or a nonvolatile random access memory (NVRAM). A memory controller (MC) 1309 controls access to the external memory 1303, such as a hard disk (HD) or an IC card. The external memory 1303 is connectable as an optional device and usable as a storage device for font data, emulation programs, and form data.

An operation unit 1311 includes various operation switches and a light-emitting diode (LED) display unit. The above-described external memory 1303 is not limited to a single memory and can be a plurality of memories which, for example, store a program capable of interpreting the language for an optional card or the control language for a different printer in addition to built-in fonts. Furthermore, the external memory 1303 can includes an NVRAM (not illustrated) which stores printer mode setting information entered through the operation unit 1311.

<Format of Electronic Document Data>

Prior to detailed description of the bookbinding application 104, an exemplary data format of a book file is described below.

A book file has a three-layer structure resembling a book composed of paper sheets. First, an upper layer is referred to as a "book" resembling a single book, which can define an attribute relating to the entire book. An intermediate layer, positioned beneath the upper layer, is referred to as a "chapter" that corresponds to a chapter of the book. Each chapter can define an attribute of each chapter. A lower layer is referred to as a "page" that corresponds to each page defined by an application program. Each page can define an attribute of each page. One book can include a plurality of chapters. One chapter can include a plurality of pages.

Figure 3A:
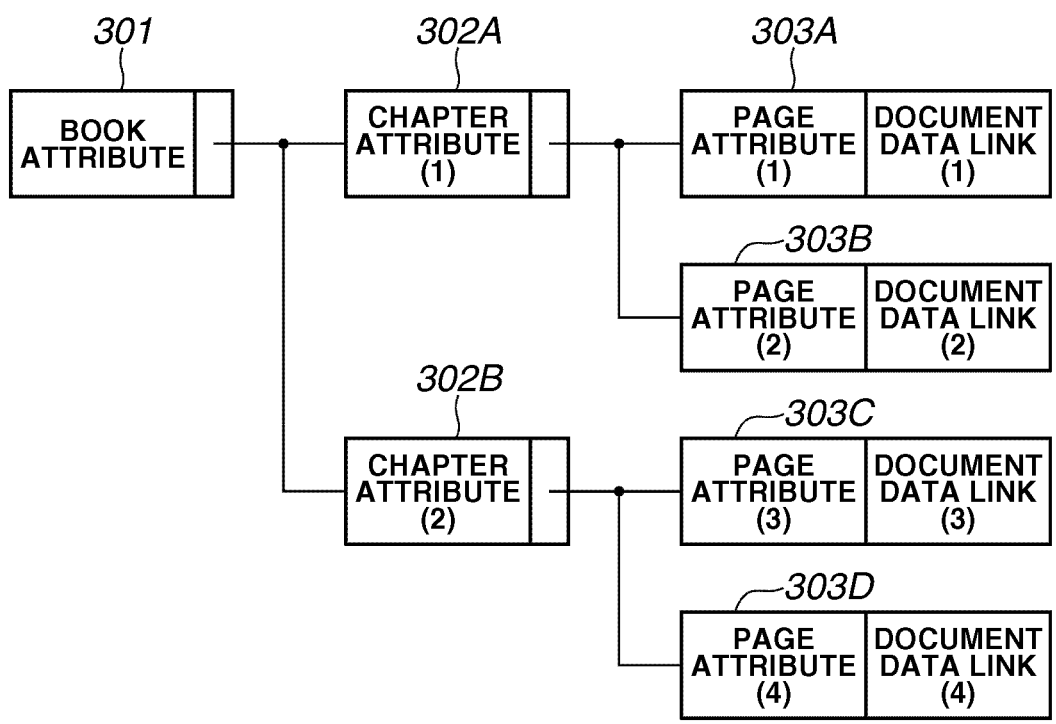
FIGS. 3A and 3B illustrate an exemplary structure of a book file.

FIG. 3A illustrates an exemplary format of a book file including a book, chapters, and pages denoted by corresponding nodes. One book file includes one book. Both the "book" and the "chapter" are the concept that defines a book structure and include defined attribute values and a link to a lower layer as its entity. The "page" includes data for each page generated by the application program as its entity. Therefore, the "page" includes the entity of document page (i.e., document page data) and a link to each document page data, in addition to its attribute values.

A print page output to a paper medium may include a plurality of document pages. The structure of each print page is not displayed as a link and displayed as part of the attributes for the book, the chapter, or the page.

Figure 3B:

In FIG. 3A, a book 301 defines its attribute (book attribute) and includes two chapters 302A and 302B linked together. The chapter 302A includes two pages 303A and 303B linked together. The page 303A defines attribute value (1) and includes a link to corresponding document page data (1). The page 303B defines attribute value (2) and includes a link to corresponding document page data (2). The document page data is the entity of each page. Similarly, the chapter 302B includes two pages 303C and 303D linked together. The page 303C defines attribute value (3) and includes a link to corresponding document page data (3). The page 303D defines attribute value (4) and includes a link to corresponding document page data (4). FIG. 3B illustrates exemplary document page data 304 including the document page data (1) and (2) representing the entity of pages 303A, 303B, 303C and 303D.

FIG. 4 illustrates an exemplary list of book attributes. An item, if defined in both upper and lower layers, describes its effective attribute value in the lower layer. Therefore, an item involved only in the book attributes has an attribute value which is valid in the entire book. However, an item defined in both the book attribute and a lower layer has valid contents being set for the book attributes. In the example illustrated in FIG. 4, each item may not correspond to a single item and may include a plurality of relevant items.

FIG. 5 illustrates an exemplary list of chapter attributes. FIG. 6 illustrates an exemplary list of page attributes. The relationship between the chapter attributes and the page attributes is similar to the relationship between the book attributes and lower layer attributes. As shown in FIGS. 4 through 6, a total of seven items of "print method", "binding gutter/binding direction", "details of bookbinding", "front cover/back cover", "index sheet", "interleaf", and "chapter break" are items unique to the book attributes and defined as valid throughout the book.

The "print method" attribute enables a user to select, as a print method, one of "one-sided print", "two-sided print", and "bookbinding print." The bookbinding print is performed according to a predetermined format so that a book can be formed through sequential processes including bundling a designated number of sheets, folding the sheets, and stitching the sheets. The "binding gutter/binding direction" attribute enables a user to designate a width of margin for binding and a binding direction (e.g., "long edge" or "short edge"). The "details of bookbinding" attribute enables a user to designate "opening direction", "total number of bundled sheets", or the like when the user selects the bookbinding print.

The "front cover/back cover" attribute enables a user to add a front cover and a back cover for an electronic document file printed as a book and designate print contents on the added covers. The "index sheet" attribute enables a user to designate an insertion of an eared index sheet, as a break of chapter, which is separately prepared for a printing apparatus and also enables a user to designate print contents on the index (eared) portion.

The "index sheet" attribute is valid for a printing apparatus equipped with an inserter that can insert a specially provided sheet into a desired position of the printed sheets. The "index sheet" attribute is valid when a printer has a plurality of sheet feed cassettes. The same thing is applied to the "interleaf" attribute.

The "interleaf" attribute enables a user to designate, as a break of a chapter, insertion of a sheet or an interleaf from an inserter or a sheet feed cassette and also designate a sheet feed source.

The "chapter break" attribute enables a user to designate the use of a new sheet or the use of a new print page at a break point of the chapter. When a user selects the "one-sided print", using a new sheet and using a new print page are not different in the meaning. If a user designates the "use of a new sheet" in a two-sided print operation, consecutive chapters are not printed on the same sheet. On the other hand, if a user designates the "use of a new print page", consecutive chapters can be printed on front and back surfaces of a sheet.

The chapter attributes do not include any item(s) unique to the chapter. All of the chapter attributes are involved in the book attributes. Therefore, if definitions in the chapter attributes disagree with definitions in the book attributes, the values defined in the chapter attributes are effective.

Five items of "sheet size", "sheet orientation", "N-up print designation", "enlarge/reduce", and "sheet discharge method" are items commonly included in the book attributes and the chapter attributes. The "N-up print designation" attribute is an item enabling a user to designate the number of document pages on a piece of printed sheet. For example, a user can select a page layout selected from the group including 1×1, 1×2, 2×2, 3×3, and 4×4. The "sheet discharge method" attribute is an item enabling a user to determine whether staple processing for discharged sheets is performed, although the "sheet discharge method" attribute is valid for a printing apparatus having a stapling function.

Five items of "page rotation designation", "zoom", "placement designation", "annotation", and "page division" are items unique to the page attribute. The "page rotation" attribute is an item enabling a user to designate a rotational angle of a document page disposed on a printed page. The "zoom" attribute is an item enabling a user to designate a zoom ratio of a document page. The zoom ratio designates a size relative to a virtual logical page region (i.e., 100%).

The virtual logical page region is a region occupied by one document page when the document page is disposed according to an N-up designation. For example, if the selected page layout is 1×1, the virtual logical page region is a region corresponding to one printed page. If the selected page layout is 1×2, the virtual logical page region is a reduced region having each side equivalent to approximately 70% of a corresponding side of one printed page. Variable item is in the page attributes.

Two attribute items of "watermark" and "header/footer" are items commonly included in the book, chapter, and page attributes. The "watermark" attribute is an image or a character string which can be superposed on print data generated by an application. The "header/footer" attribute is information printed in a top margin and/or a bottom margin of each page. The "header/footer" attribute includes item(s) that can be designated with variables, such as a page number and date/time. The contents designated in the "watermark" attribute and the "header/footer" attribute are similarly defined in the chapter attributes and the page attributes.

The book attributes are different from the chapter attributes and the page attributes. The book attributes can define the contents of the watermark and the header/footer and also designate a print method of the watermark and the header/footer throughout the book. On the other hand, the chapter attributes and the page attributes can determine whether the watermark and the header/footer defined in the book attributes are applied to each chapter or each page.

<Book File Generation Procedure>

The bookbinding application 104 and the electronic document writer 102 generate a book file having the above-described structure and contents. The book file generation procedure is part of a book file edit operation performed by the bookbinding application 104.

FIG. 7 is a flowchart illustrating an exemplary procedure for opening a book file performed by the bookbinding application 104. The CPU 201 of the host computer 100 executes each step in the flowchart of the present embodiment.

In step S701, the bookbinding application 104 determines whether a book file to be opened is a new one or an already existing one. If the opened book is a new one (YES in step S701), the processing flow proceeds to step S702. In step S702, the bookbinding application 104 newly generates a book file including no chapter. According to the example illustrated in FIG. 3A, a newly generated book file has only the book node 301 and has no link to a chapter node. A set of book attributes for a new book file is prepared beforehand.

Figure 11:
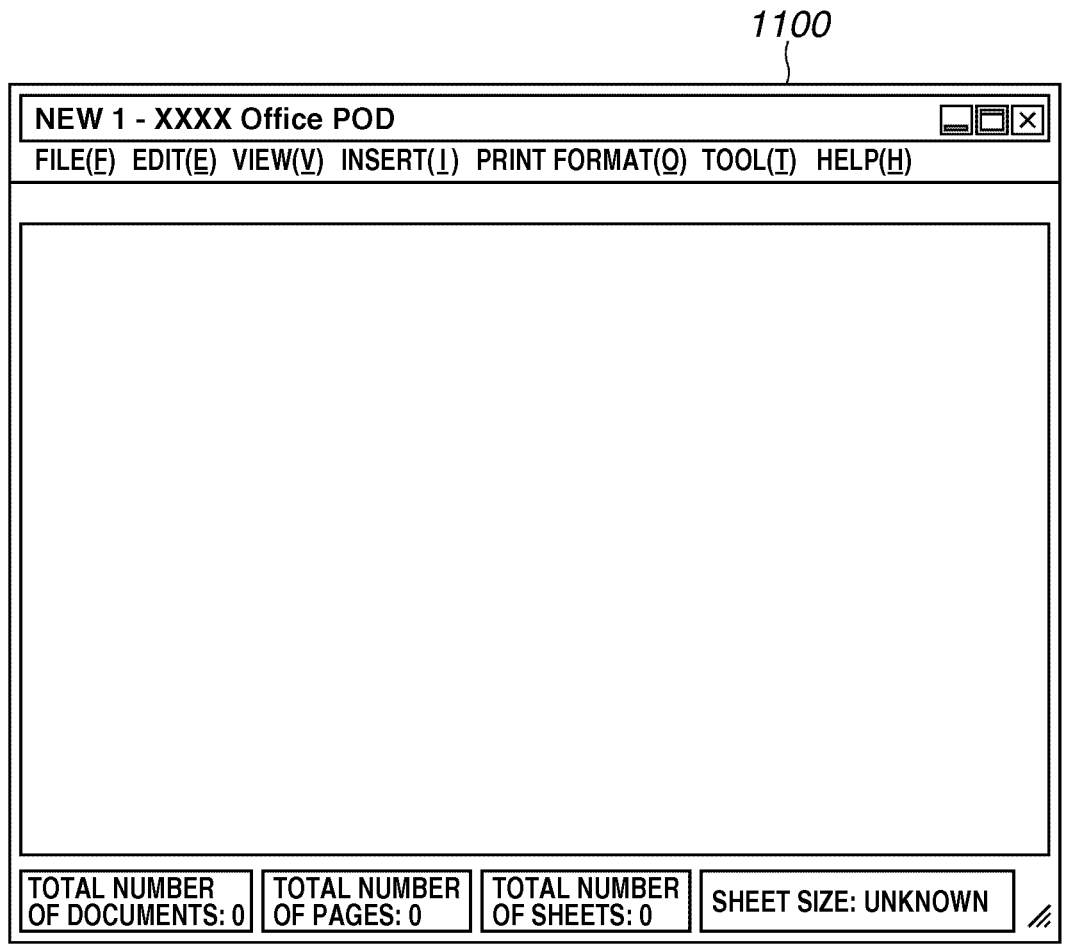
FIG. 11 illustrates an exemplary UI screen displayed when a book file is newly generated.

Then, in step S704, the bookbinding application 104 displays a user interface (UI) screen to enable a user to edit a new book file. FIG. 11 illustrates an exemplary UI screen displayed when a book file is newly generated. In this case, the new book file has no substantial contents and, therefore, nothing is displayed on a UI screen 1100.

Figure 10:
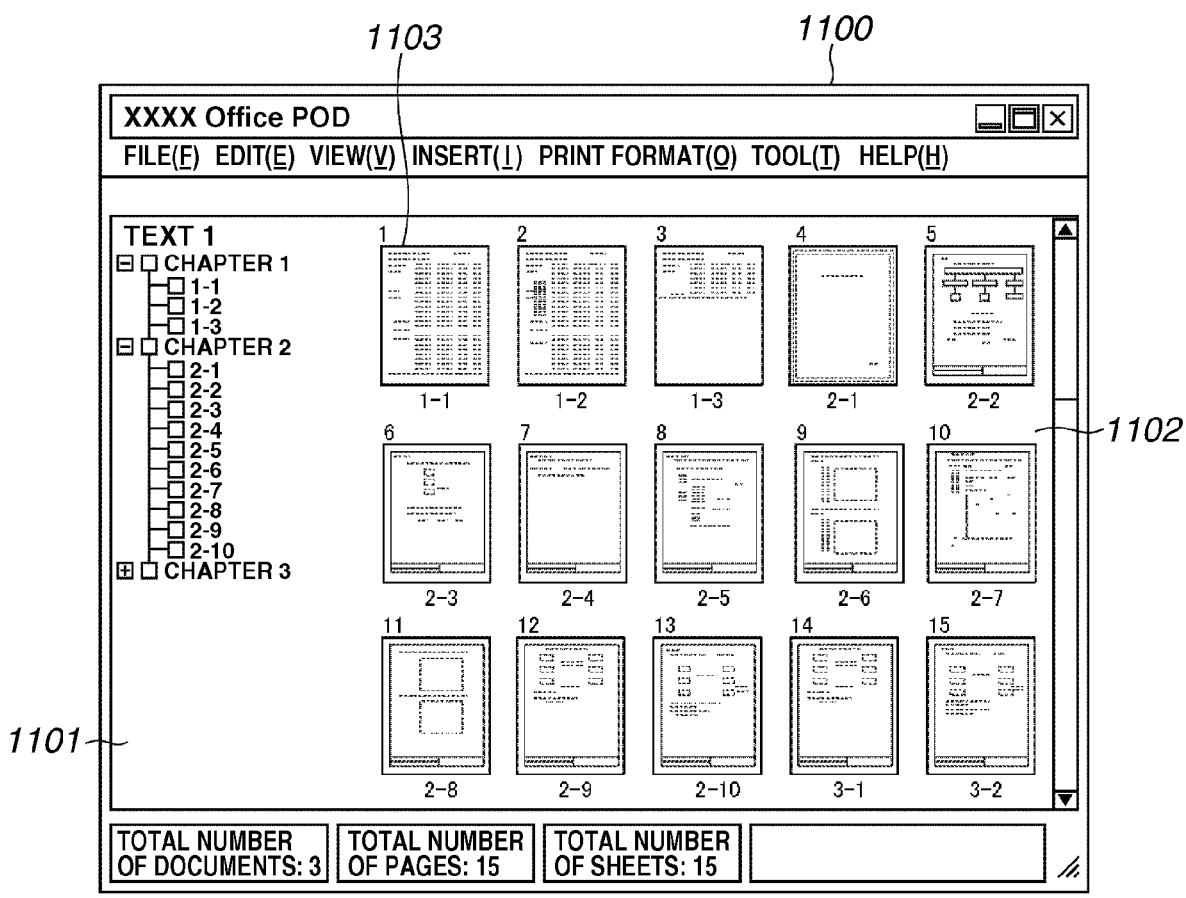
FIG. 10 illustrates an exemplary user interface (UI) screen for a bookbinding application.

On the other hand, if there is any book file already existing (NO in step S701), the processing flow proceeds to step S703. In step S703, the bookbinding application 104 opens a designated book file. In step S704, the bookbinding application 104 displays a user interface (UI) screen based on the structure, attribute, and contents of the book file. FIG. 10 illustrates an exemplary UI screen displayed when an already existing book file is designated.

The UI screen 1100 includes a tree section 1101 that illustrates a book structure and a preview section 1102 that displays the state of printed pages. The tree section 1101 displays all chapters included in a book and pages included in each chapter to form a tree structure as illustrated in FIG. 3A. Each page displayed in the tree section 1101 corresponds to a document page. The preview section 1102 displays a reduced image 1103 of each printed page. The display order in the preview section 1102 reflects the structure of a book.

Any application data converted into an electronic document file by the electronic document writer 102 can be added, as a new chapter, to the opened book file. This function is referred to as an electronic document import function. When an electronic document is imported to the book file newly generated by the procedure illustrated in FIG. 7, the book file can possess a substantial entity. The electronic document import function can be activated when a user drags and drops any application data on the screen illustrated in FIG. 10.

FIG. 8 is a flowchart illustrating an exemplary electronic document import procedure. First, the bookbinding application 104 activates an application program which has generated designated application data. In step S801, the bookbinding application 104 designates the electronic document writer 102 as a device driver to print/output the application data. The bookbinding application 104 converts the application data into electronic document data.

After completing the conversion, in step S802, the bookbinding application 104 determines whether the converted data is image data, for example, based on a file extension of the application data if the OS is Windows®. More specifically, for example, if the extension is "bmp", the bookbinding application 104 can determine that the converted data is Windows® bitmap data. If the extension is "jpg", the bookbinding application 104 can determine that the converted data is Joint Photographic Experts Group (JPEG) compression image data. If the extension is "tiff", the bookbinding application 104 can determine that the converted data is Tagged Image File Format (TIFF) image data. Furthermore, if the converted data is image data, the bookbinding application 104 can directly generate an electronic document file based on image data without activating any application.

If the bookbinding application 104 determines that the converted data is not image data (NO in step S802), the processing flow proceeds to step S803. In step S803, the bookbinding application 104 adds the electronic document file generated in step S801 to the presently opened book file as a new chapter of the book. In this case, if items are commonly defined for the book attributes and the chapter attributes, the bookbinding application 104 copies attribute values of the book attributes for the chapter attributes. Otherwise, the bookbinding application 104 sets default values prepared beforehand.

If the converted data is image data (YES in step S802), the processing flow proceeds to step S804. In the step S804, the bookbinding application 104 does not add a new chapter. The bookbinding application 104 adds each document page of the electronic document file generated in step S801 to a designated chapter.

However, if a new book file is generated, a new chapter is generated and each page of an electronic document file is added as a page belonging to this chapter.

The page attributes may include attribute values commonly used for the page attributes and upper layer attributes or attribute values defined by application data if continuously used for an electronic document file. For example, if N-up print is designated in the application data, its attribute value is continuously used. In this manner, a new book file is generated or a new chapter is added.

FIG. 9 is a flowchart illustrating an exemplary procedure of step S801 in FIG. 8, according to which the electronic document writer 102 generates an electronic document file.

First, in step S901, the bookbinding application 104 generates and opens a new electronic document file. The bookbinding application 104 activates an application corresponding to designated application data and transmits an output command to an output module of the OS while designating the electronic document writer 102 as a device driver.

In step S902, the output module causes the electronic document writer 102 to convert the received output command into electronic document format data, and outputs the converted data to the electronic document file opened in step S901.

In step S903, the bookbinding application 104 determines whether the conversion processing has been completed for all designated data. If the conversion processing for all designated data has been completed (YES in step S903), the processing flow proceeds to step S904 to close the electronic document file. If the conversion processing for all designated data has not been completed (NO in step S903), the processing flow returns to step S902. An electronic document file generated by the electronic document writer 102 is a file that includes the entity of the document page data illustrated in FIG. 3B.

<Edit of Book File>

The present embodiment allows a user to perform the following edit operations for each chapter and each page of a book file generated based on application data as described above.

(1) new addition
(2) delete
(3) copy
(4) cut
(5) paste
(6) shift
(7) change chapter name
(8) renumber/rename page
(9) insert cover
(10) insert interleaf
(11) insert index sheet
(12) document page layout Furthermore, the present embodiment allows a user to cancel an edit operation after having been once set or allows a user to instruct execution of a once canceled operation. In short, the edit functions according to the present embodiment enable a user to perform various operations including integration of a plurality of book files, relocation of chapters and pages in a book file, deletion of chapters and pages in a book file, layout change of a document page, and insertion of an interleaf or an index sheet.

If a user performs the above-described operations, the system according to the present embodiment adds the operation result to the attributes illustrated in FIGS. 4 and 5 or changes the structure of a book file.

For example, if a user instructs addition of a new blank page, the system according to the present embodiment inserts a blank page to a designated portion. The inserted blank page is regarded as a document page. Furthermore, if a user changes the layout of a document page, the system according to the present embodiment adds the change contents as part of the attributes (e.g., print method, N-up print, front cover/back cover, index sheet, interleaf, and chapter break). In addition, the bookbinding application 104 can be called a print setting application.

<Output of Book File>

A book file generated/edited as described above is printed as a final output. If a user selects a file menu from the UI screen 1100 of the bookbinding application illustrated in FIG. 10 and designates printing of the selected file name, a designated output device prints out the selected file. In this case, the bookbinding application 104 generates a job ticket based on the presently opened book file and transmits the generated job ticket to the electronic document despooler 105.

The electronic document despooler 105 receives the job ticket and converts the received ticket into an output command of the OS (e.g., GDI function of Windows®) and transmits the output command to an output module (e.g., GDI). The output module generates a command adaptable to the output device with a designated printer driver 106 and transmits the generated command to the output device.

The job ticket has a data structure including document pages (minimum units). The data structure for a job ticket defines the layout of document pages on a sheet. One job ticket can be issued for one job. Therefore, a job ticket includes an upper-layer node "document" which defines attributes of the entire document, such as two-sided print/one-sided print. Paper nodes, each positioned below the document node, include an identifier of paper to be used and designation of a paper feed port of a printer.

A node of a sheet printed with the paper belongs to each paper node. One sheet corresponds to a piece of paper. A printed page (i.e., a physical page) belongs to each sheet. If the print method is one-sided print, one physical page belongs to one sheet. If the print method is two-sided print, two physical pages belong to one sheet.

A disposed document page belongs to each physical page. Furthermore, attributes for a physical page include the layout of a document page. The electronic document despooler 105 converts the above-described job ticket into a command to be supplied to the output module.

\<Other System Arrangement\>

As described above, the document processing system according to the present embodiment is a stand-alone type system. Generation and edit of a book file can be realized with a similar arrangement and procedure even if the present embodiment is applied to an expanded server client system, although a book file and print processing are managed by the server.

Figure 12:
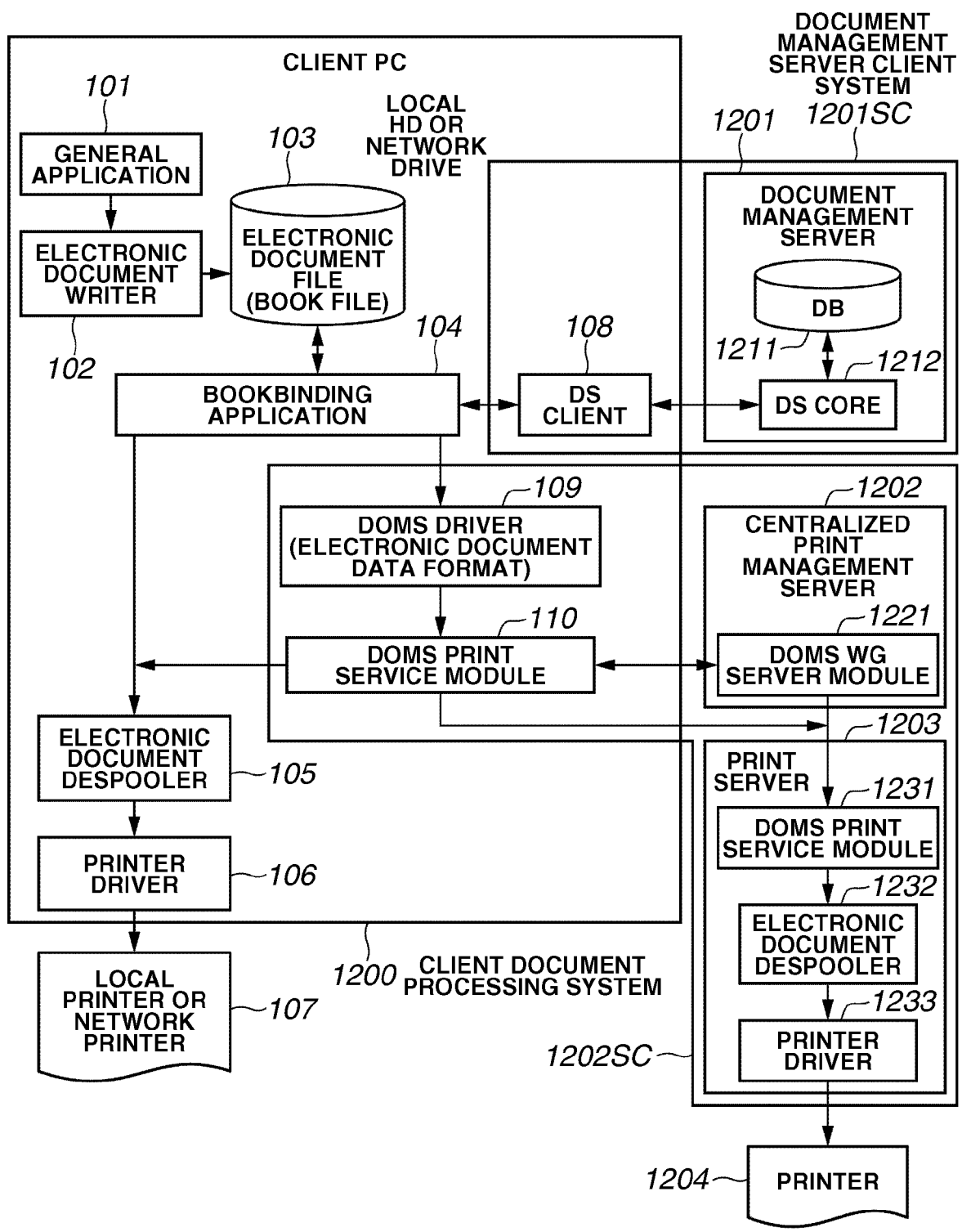
FIG. 12 is a block diagram illustrating an exemplary software arrangement of a client server type document processing system.

FIG. 12 is a block diagram illustrating an exemplary arrangement of a server client type document processing system. A client document processing system 1200 illustrated in FIG. 12 includes client modules, such as a document output management service (DOMS) driver 109, a DOMS print service module 110, a document service (DS) client module 108, in addition to the arrangement of a stand-alone type system.

The client document processing system 1200 is connected to a document management server 1201, a centralized print management server 1202, and a print server 1203, via an ordinary network. However, if the server can function as a client, the servers 1201 through 1203 can be connected to the client document processing system 1200 using interprocess communication simulating the internetwork communication.

According to the example illustrated in FIG. 12, both the document management server 1201 and the centralized print management server 1202 are connected to the client. However, only one of the document management server 1201 and the centralized print management server 1202 may be connected to the network. For example, if only the document management server 1201 is connected to the network, a document management server client system 1201SC including the client module 108 of the document management server 1201 is added to the stand-alone type document management system. Furthermore, if only the centralized print management server 1202 is connected to the network, a print management server client system 1202SC including client modules of the centralized print management server 1202 is added to the stand-alone type document management system.

The document management server 1201 is a server capable of storing book files generated and edited by the bookbinding application 104. The document management server 1201 has a database 1211 that can store book files to be managed. The book file storage and reading processing between the bookbinding application 104 and the document management server 1201 is performed via the DS client 108 and a DS core 1212.

The centralized print management server 1202 manages printing of a book file stored in the client document management system 1200 or in the document management server 1201. A print request issued by the client is transmitted via the DOMS driver 109 and the DOMS print service module 110 to a document output management service workgroup (DOMSWG) server module 1221 of the centralized print management server 1202.

When printing is performed by the printer 107 of the client, the centralized print management server 1202 sends electronic document data to the electronic document despooler 105 via the DOMS print service module 110 of the client. Furthermore, when printing is performed by the print server 1203, the centralized print management server 1202 transmits the electronic document data to a DOMS print service module 1231 of the print server 1203. For example, the centralized print management server 1202 performs a security check about a user who has requested print of a stored book file and stores a print processing log. As described above, the document processing system can be arranged as a stand alone system or a client server system. An electronic document despooler 1232 is similar to the electronic document despooler 105. A printer driver 1233 is similar to the printer driver 106. A printer 1204 is similar to the printer 107.

\<Contents of Preview Display\>

As described above, when the bookbinding application 104 opens a book file, the bookbinding application 104 displays the user interface screen 1100 as illustrated in FIG. 10. A tree illustrated in the tree section 1101 represents a structure of the opened book (hereinafter, referred to as "attentional book"). The present embodiment prepares a total of three display methods for the preview section 1102, which are selectable depending on a user's preference.

A first display method is referred to as "document view mode" which directly displays reduced images of document pages belonging to the attentional book, although the display in the preview section 1102 does not reflect the layout. A second display method is referred to as "print view mode" which displays document page images in the preview section 1102 that reflect the layout of the document pages. A third display method is referred to as "simple print view mode" which does not display the contents of each document page in the preview section 1102 although the layout is reflected.

\<Book File Edit Function\>

The information processing apparatus includes a document editor that enables a user to edit text/images of a book file generated by the bookbinding application 104. The document editor is one of functions included in the bookbinding application 104.

Figure 13:
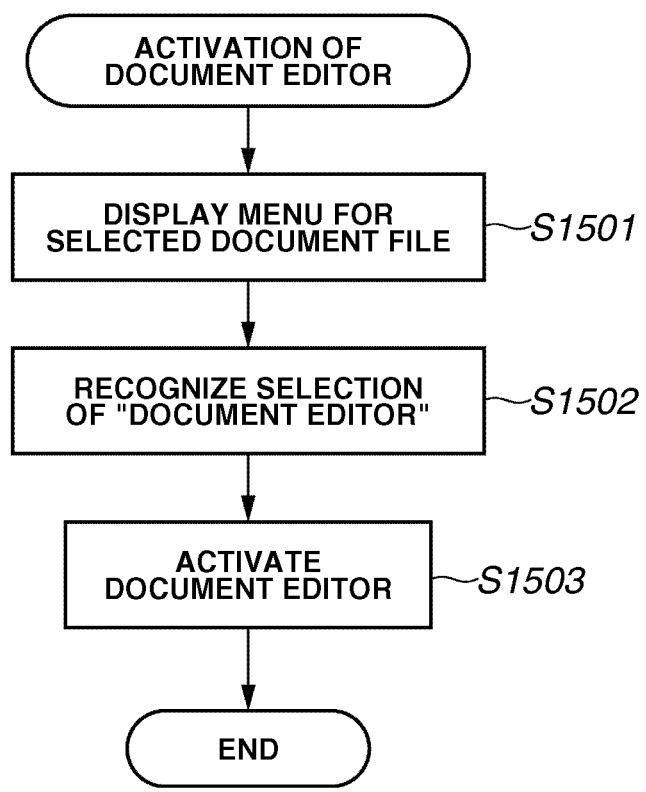
FIG. 13 is a flowchart illustrating exemplary processing for activating a document editor.

The bookbinding application 104 can activate the document editor and edit each logical page of a book file. FIG. 13 is a flowchart illustrating exemplary processing for activating the document editor. First, in step S1501, the bookbinding application 104 displays a menu for a selected document file. Then, in step S1502, the bookbinding application 104 recognizes that the "document editor" is selected from the menu. In step S1503, the bookbinding application 104 activates the document editor and displays a main screen.

The above-described document editor, as a function of the bookbinding application 104, enables a user to select an imported document file with a mouse pointer to display a pop-up menu and select a "document editor" on the menu. However, any other method (e.g., a tool button, a menu item, etc.) can be used to activate the document editor.

Figure 14:
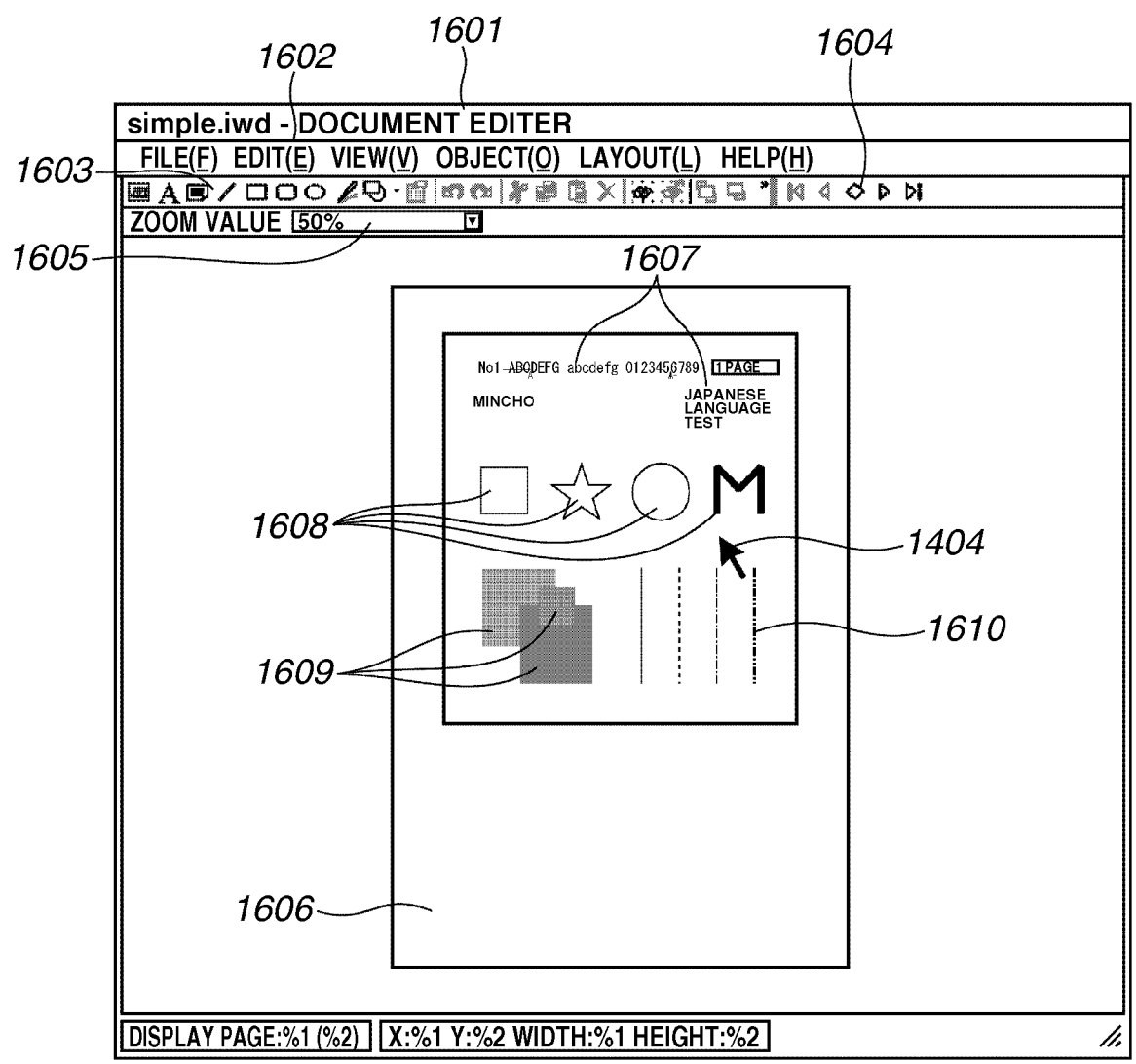
FIG. 14 illustrates an exemplary main UI screen for the document editor.

The document editor according to the present embodiment can realize the following edit function. FIG. 14 illustrates a main user interface (UI) screen of an exemplary document editor 1601 including a menu bar 1602, a tool button 1603, a page shift button 1604, a zoom designation box 1605, and a document file 1606 (i.e., an object to be edited). The document file 1606 includes a text object 1607, graphic objects 1608 and 1609, and a line object 1610. The present embodiment enables a user to perform the following edit operations based on the example illustrated in FIG. 14. The cursor arrow 1404 is a mouse cursor.

\<Text Edit Function\>

If a user selects the text object 1607 of the document file 1606 with a mouse pointer, the selected text is set as an object to be edited (i.e., displayed as an object being in a selected state). A control handle is displayed on the object being in a selected state so that a user can recognize the selected object. The control handle can be replaced with a circumscribed rectangle surrounding a text object. A user is allowed to shift or delete the selected text object, change the text attributes, and add a new text.

The bookbinding application 104 extracts, as a text object, a text of the document file when a user selects it with the mouse pointer. Next, the bookbinding application 104 executes edit processing (including addition/deletion of a text, change of text attributes, and shift/delete of the extracted text object) on the selected text object.

The bookbinding application 104 can execute text addition processing. If a user again selects the text object being in a selected state with the mouse pointer, a rectangular edit cursor surrounding the text object is displayed. The user can shift the cursor to a position where a text is added. The user can input characters to be added to the text. Similarly, the bookbinding application 104 can execute text delete processing.

The bookbinding application 104 can edit attributes of a text included in each text object. The text attributes include font, style, size, color, character decoration, character interval, horizontal scaling rate, and word interval.

<Text Box Edit Function>

The text object to be edited is not limited to text composed of a single row. The document editor is capable of newly generating text composed of plural rows. A text box is available when a user edits plural rows of text.

The bookbinding application 104 operates in a text box generation mode and generates a rectangular text box based on a mouse-drag operation. Next, the bookbinding application 104 performs text object edit processing (including edit of text box attribute and shift/delete of the text box) in the generated text box.

More specifically, in the text box generation mode, a user can draw a rectangle (i.e., a text box) on the document file 1606 with the mouse pointer. A control handle is displayed in the generated text box in response to new generation and selection of a box. A user can resize the box by dragging the control handle with the mouse pointer.

If a user reselects a text box being in a selected state with the mouse pointer, an edit cursor is displayed in the box. In this state, the user can add new text into the text box. Similarly, a user can delete any text in the text box. If a user inputs long text, the text adding processing restarts from the left edge of the next row.

Similarly, a user can edit any attribute of a text box and any attribute of text in the text box. The text box attributes include line type, line width, line color, painting, and transparency. The text attributes in the text box is similar to the text object attributes.

<Image Edit Function>

The document editor has an image edit function which includes "insertion of image" and "writing of image." Regarding the "insertion of image", the bookbinding application 104 operates in an image insertion mode and displays an image selection dialog. The editor displays an image selected by a user on the dialog. The bookbinding application 104 executes edit processing (e.g., rotation, shift, delete, etc.) on the displayed image.

When a user instructs insertion of an image via the UI, the bookbinding application 104 displays an image insertion dialog. A user can select an image file to be inserted using the image insertion dialog. The selected image object is displayed on the document. According to the above-described method, an image is inserted into the document file 1606. The image insertion position is the center of the document file. However, the image insertion position is not limited to the center and, therefore, can be changed to an upper left referential point or a lower left referential point. Furthermore, the insertion method is not limited to the menu bar 1602. The tool button 1603 or the like can be used. A user can edit (e.g., rotate, shift, and delete) the inserted image or the image object disposed on the document file.

Regarding the "writing of image", the bookbinding application 104 extracts an image selected by a user and displays an image writing dialog selected from the pop-up menu.

When a user inputs a writing destination (location) and a file name of an image to be written, the bookbinding application 104 stores the image to a position corresponding to the input information. The bookbinding application 104 selects an image designated by a user as an image to be written, and designates writing of an image. The bookbinding application 104 displays an image writing dialog in response to designation of the writing of an image. The document editor performs the writing of an image based on the writing location and the image file name being set in the displayed dialog.

<Graphic Object Edit Function>

The document editor has a graphic object edit function. The graphic object type includes rectangle, ellipse, rounded-corner quadrangle, straight line, auto shape, and other arbitrary graphics. The document editor can newly generate and edit these graphic objects. The document editor can select any graphic object drawn in a document file and edit the selected object. The processing for newly generating and editing graphic objects by the document editor includes shifting/deletion or change of each attribute (color, line type, etc.) as conventionally known.

The bookbinding application 104 starts graphic object generation processing and generates a graphic object using a rectangle drawn by a user based on a mouse-drag operation. When the bookbinding application 104 newly generates a graphic object to be edited (including edit of attribute, shift/delete, etc.), a user can select an object from the tool bar (i.e., select a desired object (e.g., line, rectangle, etc.) to generate the selected object based on a mouse-drag operation. Furthermore, the document editor displays a control handle on the object being in a selected state so that a user can recognize the selected object.

<Depth Position Information Change Function>

Figure 15:
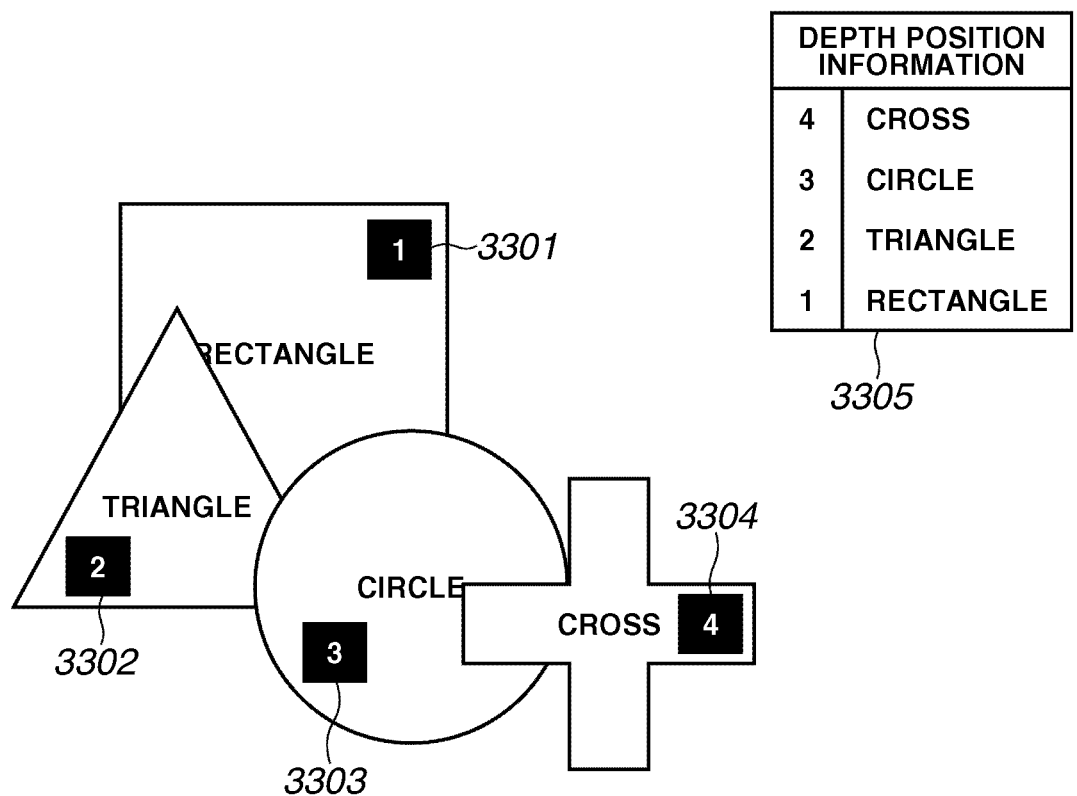
FIG. 15 illustrates exemplary depth position information.

Each of the above-described objects (i.e., text object, text box, image, and graphic objects) is assigned depth position information (which can be referred to as "drawing order") 3305 which indicates the order of drawing on a screen as illustrated in FIG. 15.

The present embodiment uses a numerical value expressing the drawing order (i.e., depth position information) of each object. An object assigned a smaller number is drawn earlier than an object assigned a larger number. According to the example illustrated in FIG. 15, objects 3301, 3302, 3303, and 3304 are drawn in this order according to the depth position information (i.e., drawing order) 3305. The object 3301 is assigned "1" as depth position information and is disposed at a rearmost side on the screen. The object 3304 is assigned "4 (corresponding to the number of objects)" as depth position information and is disposed at a foremost side on the screen.

Figure 16:
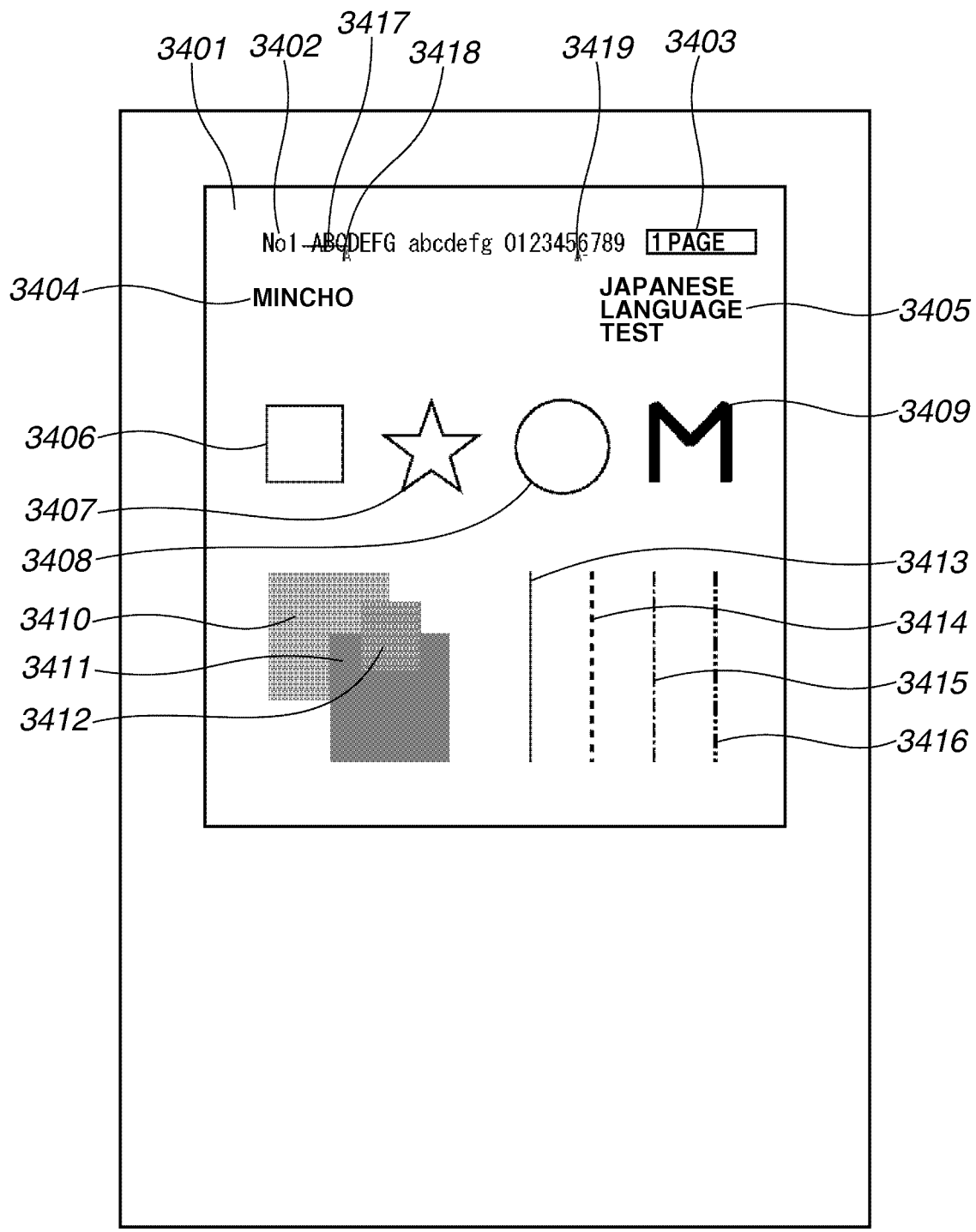
FIG. 16 illustrates an exemplary main UI screen for the document editor.

FIG. 16 illustrates exemplary depth position information for the logical page illustrated in FIG. 14. According to the example illustrated in FIG. 16, objects 3401 through 3419 are drawn in this order. More specifically, the object 3419 is disposed at a foremost side. In this manner, the information processing apparatus according to the present embodiment displays a plurality of objects on an operation screen according to the drawing order assigned to each of the plurality of objects.

Figure 17:
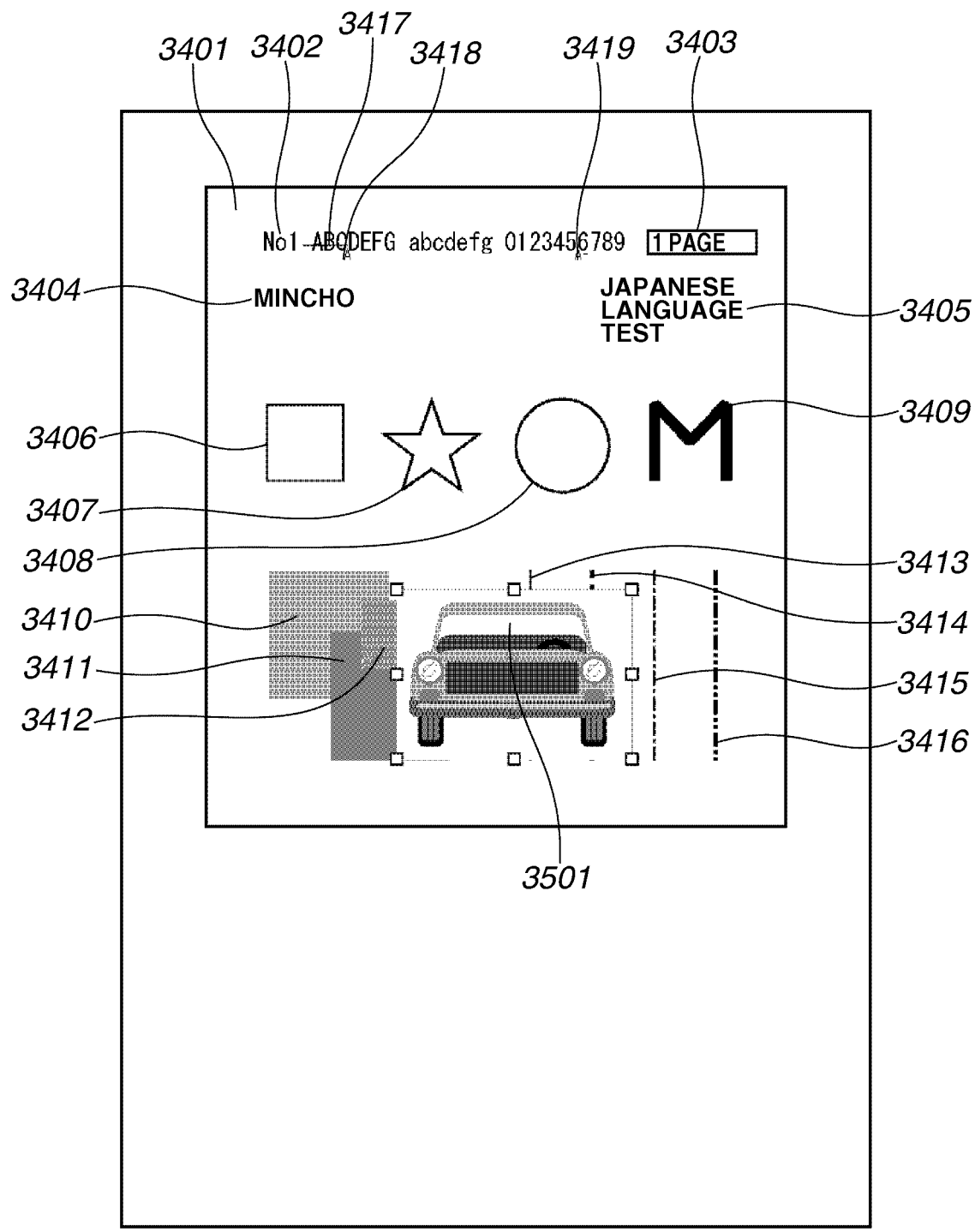
FIG. 17 illustrates exemplary depth position information in a situation where an object is newly added.

FIG. 17 illustrates an exemplary addition of a new object 3501. According to the example illustrated in FIG. 17, the object number (i.e., total number of objects) is "19" before the object 3501 is added and becomes "20" after the object 3501 is added. Therefore, the bookbinding application 104 stores the updated object number (i.e., 20) as depth position information for the newly added object 3501.

The document editor has a depth position information (i.e., drawing order) change function. The depth position information change function is a function for enabling a user to change the depth position information (i.e., drawing order) added to an object. When a user executes a specific operation, the bookbinding application 104 displays a depth position information change UI that enables a user to designate a desirable change method, such as "shift to foremost side", "shift to rearmost side", "shift forward", and "shift rearward."

If a user selects an option "shift to foremost side", the bookbinding application 104 sets the object number as depth position information for a designated object. If a user selects an option "shift to rearmost side", the bookbinding application 104 sets "1" as depth position information for the designated object. If a user selects an option "shift forward", the bookbinding application 104 increments (i.e., adds "1" to) the depth position information for the designated object and decrements (i.e., subtracts "1" from) the depth position information for an object having been larger than the designated object by "1" in the depth position information.

If a user selects an option "shift rearward", the bookbinding application 104 decrements (i.e., subtracts "1" from) the depth position information for the designated object and increments (i.e., adds "1" to) the depth position information for an object having been smaller than the designated object by "1" in the depth position information.

The bookbinding application 104 displays all objects rearranged according to the updated depth position information so that the display result can reflect the user's selected change processing.

<Depth Position Information Change Function>

Figure 18:
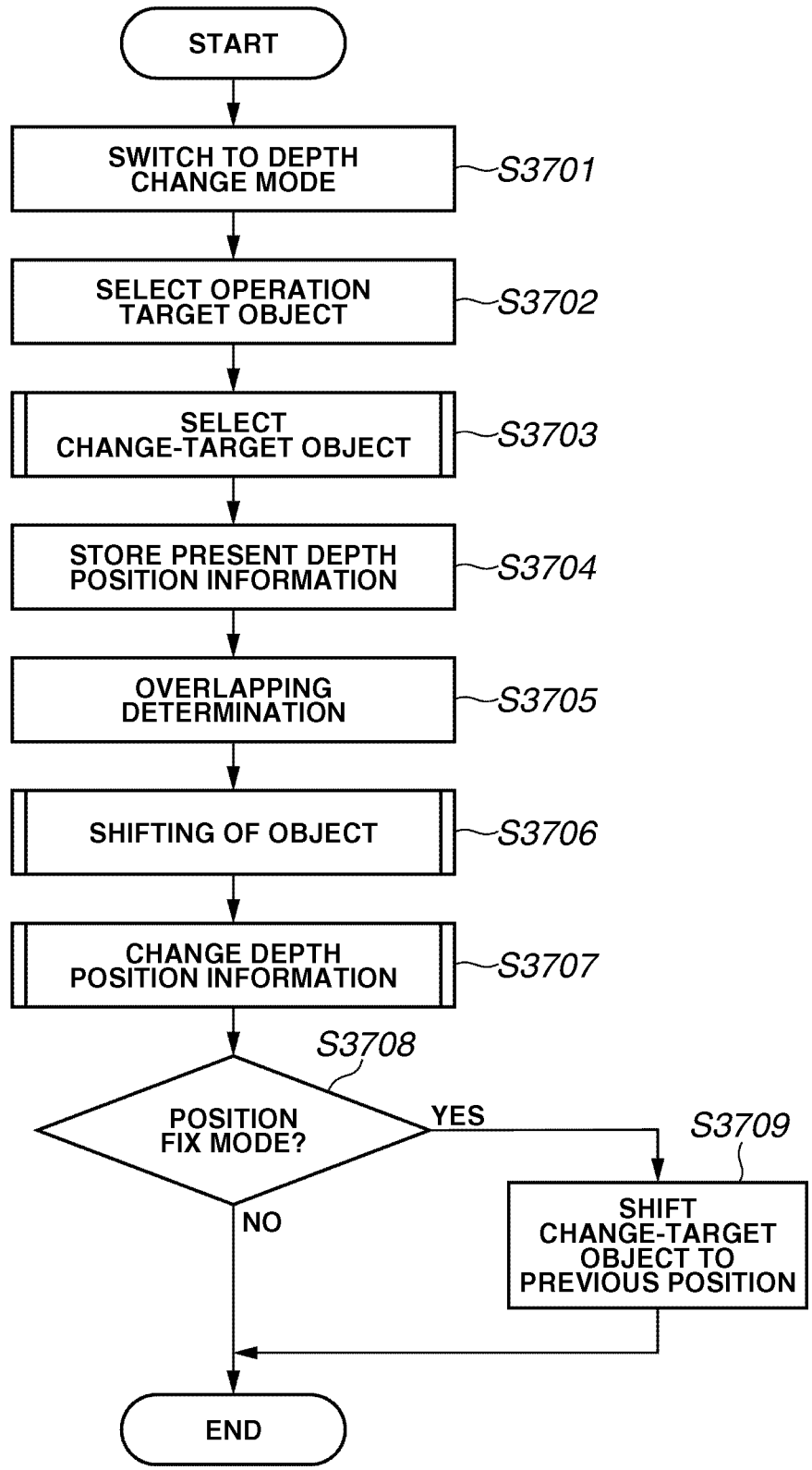
FIG. 18 is a flowchart illustrating an exemplary operation procedure for changing depth position information in an object shifting operation.

The system according to the present embodiment can change depth position information in an object shift operation, as an object edit operation. FIG. 18 is a flowchart illustrating an exemplary processing procedure for changing depth position information in an object shift operation.

In step S3701, the bookbinding application 104 selects a depth change mode according to a user's instruction entered through a setting screen. In the present embodiment, the setting screen provides two modes selectable during an object shift operation, i.e., an "ordinary shift" mode that performs only shifting and a "change depth position information in an object shift operation" mode.

FIG. 19 illustrates an exemplary UI for enabling a user to change the depth change mode. When a user selects an item 3801 or 3802 in FIG. 19, the bookbinding application 104 switches the depth change mode to the "change depth position information in an object shift operation" mode.

Next, in step S3702, the bookbinding application 104 selects an operation target object, which is a target for a change in depth position information. As an exemplary selection method, the bookbinding application 104 can designate any object existing in a user's selected region as an operation target object. As another selection method, if a change-target object is selected by a user, the bookbinding application 104 can designate any object overlapping the change-target object as an operation target object.

Furthermore, the bookbinding application 104 can designate an operation target object based on the type of object. For example, the bookbinding application 104 can exclude any text object. Furthermore, the bookbinding application 104 can designate all objects as operation target objects.

Furthermore, when a user executes a specific operation, the bookbinding application 104 displays a UI for enabling the user to designate an operation target object. If a user selects an item "select an operation range" and an item "manual" on the setting screen, the user can select a desirable operation range with a mouse. Then, the bookbinding application 104 selects an object included in the selected range as an operation target object.

When a user performs a drag-and-drop operation with the mouse, the bookbinding application 104 selects any object completely involved in a rectangular region formed by the drag-and-drop operation as an operation target object. However, the selection of an operation target object is not limited to the above-described method. For example, the bookbinding application 104 can select an object partly involved in the rectangular region as an operation target object. A user selects an option "select an object overlapping a change-target object" on the operation target object designation UI. In this case, the bookbinding application 104 selects an object overlapping a change-target object selected in the later-described step S3703 as an operation target object.

Figure 20:
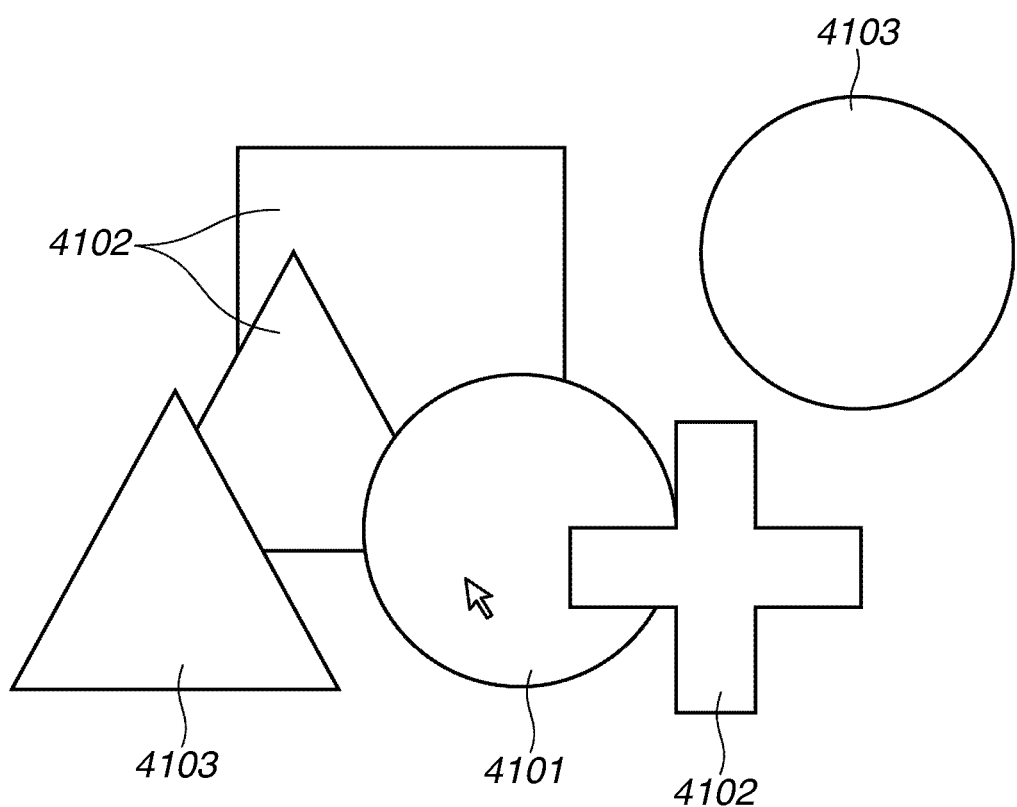
FIG. 20 illustrates an exemplary operation target object overlapping a change-target object.

FIG. 20 illustrates an exemplary operation target object overlapping a change-target object. After a user selects a change-target object 4101, the bookbinding application 104 performs an overlapping determination (refer to step S3705). The bookbinding application 104 determines that three objects 4102 overlap the selected change-target object 4101. The bookbinding application 104 designates each object 4102 as an operation target object. The bookbinding application 104 doesn't designate each object 4103 as an operation target object.

Furthermore, the operation target object designation UI includes an option "select no text object" and an option "select no image object." If a user selects one of these options, the bookbinding application 104 selects an operation target object depending on the attribute of each object.

Referring back to the flowchart of FIG. 18, in step S3703, the bookbinding application 104 designates an object selected by a user on the operation screen that displays a plurality of objects as a change-target object whose depth position information (i.e., drawing order) is to be changed. The selection processing in step S3703 can be performed in the same manner as the processing for selecting an object to be shifted. A plurality of change-target objects can be selected.

Figure 21:
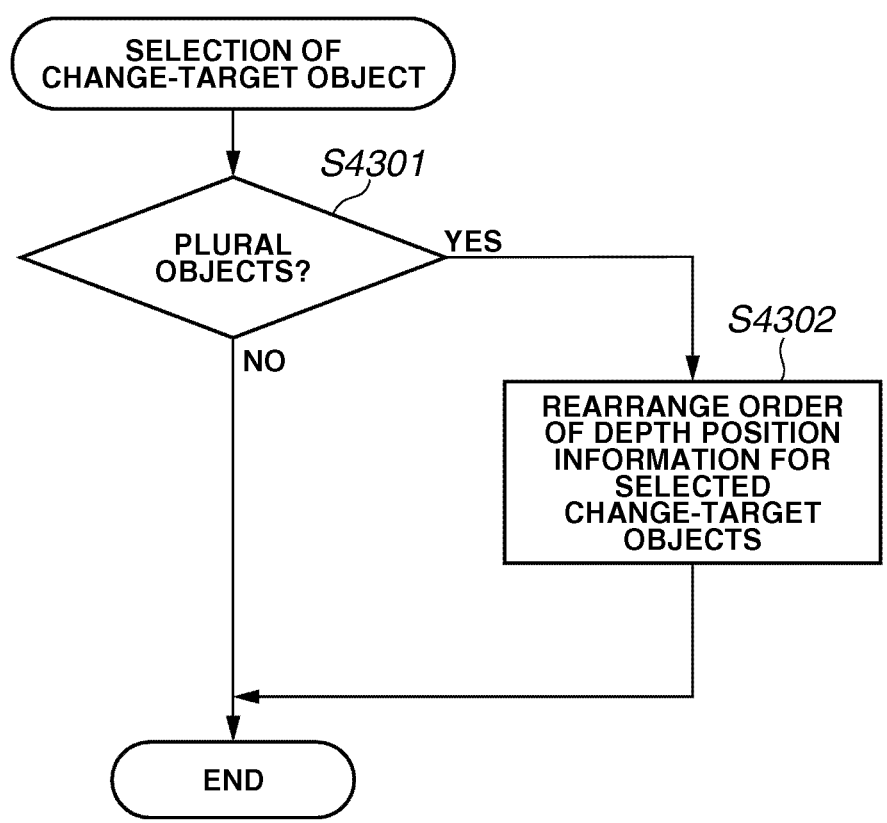
FIG. 21 is a flowchart illustrating exemplary change-target object selection processing.

FIG. 21 is a flowchart illustrating exemplary change-target object selection processing. First, in step S4301, the bookbinding application 104 determines whether plural change-target objects are selected. If the bookbinding application 104 determines that there are plural change-target objects (YES in step S4301), the processing flow proceeds to step S4302. In step S4302, the bookbinding application 104 searches for a change-target object having the largest depth position information. Then, the bookbinding application 104 rearranges the change-target objects so that the change-target objects are consecutively disposed from the foremost side in a region including the selected objects.

Figure 22:
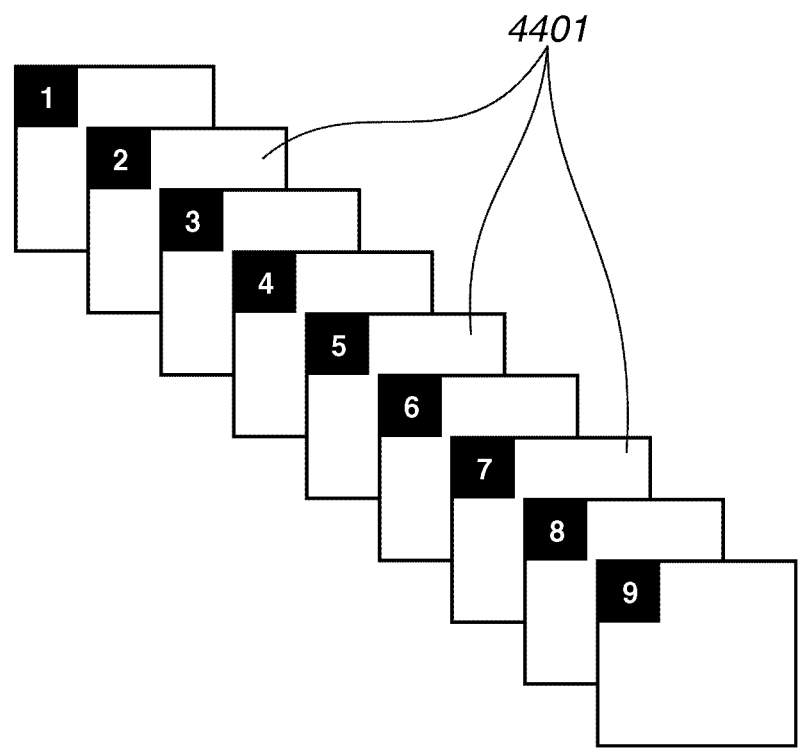
FIG. 22 illustrates an exemplary overlapping of a plurality of objects including change-target objects.
Figure 23:
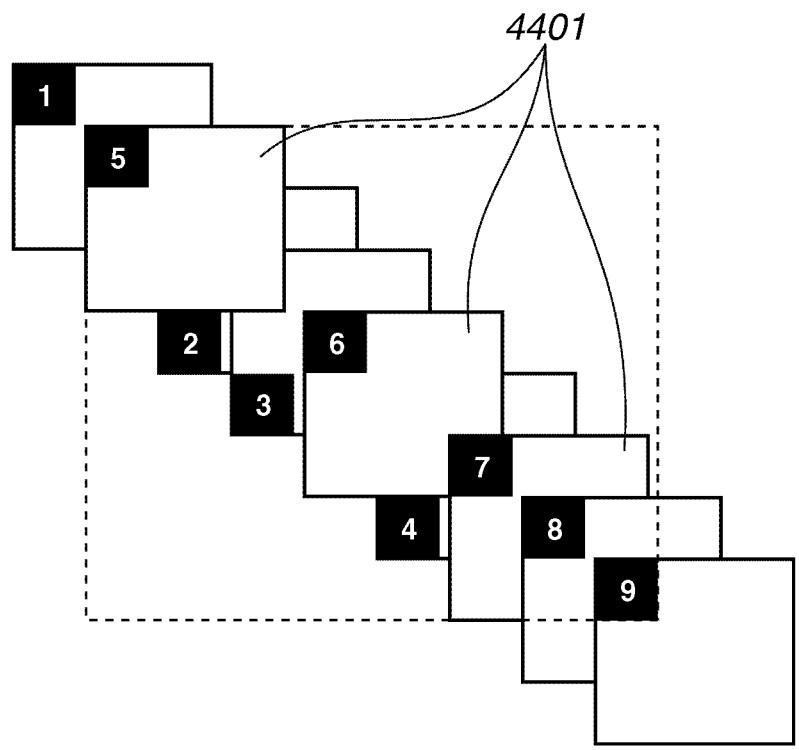
FIG. 23 illustrates an exemplary selection of a plurality of change-target objects.

For example, a user may select a plurality of change-target objects 4401 in an exemplary layout illustrated in FIG. 22. The selected change-target objects 4401 have depth position information "2", "5", and "7" respectively in an initial condition illustrated in FIG. 22. FIG. 23 illustrates the change-target objects 4401 after being selected.

In the processing of step S4302, the bookbinding application 104 changes the depth position information for the change-target objects so as to consecutively decrease from the maximum value (e.g., 7) in the change-target objects. In this case, the bookbinding application 104 does not change the positional relationship of the change-target objects in the depth direction.

More specifically, the bookbinding application 104 changes the depth position information for the change-target object having depth position information "5" in the initial condition illustrated in FIG. 22 to have depth position information "6." Furthermore, the bookbinding application 104 changes the depth position information for the change-target object having depth position information "2" in the initial condition illustrated in FIG. 22 to have depth position information "5." FIG. 23 illustrates the updated depth position information for the change-target objects.

Subsequently, the bookbinding application 104 changes the depth position information for the remaining objects other than the change-target objects while maintaining the positional relationship of the objects in the depth direction. In other words, the change target objects having original positions, "1", "2", "3", "4", "5", "6", and "7", are changed to the positions "1", "5", "2", "3", "6", "4", and "7", respectively.

After completing the selection of the change-target object(s), in step S3704, the bookbinding application 104 stores the depth position information for the change-target object(s) selected in step S3703 as present depth position information that can be used to manage the depth position information for a change-target object being shifting.

If two or more change-target objects are selected, the bookbinding application 104 stores the depth position information for the foremost object in the selected change-target objects (i.e., a maximum value in the depth position information according to the present embodiment) as the present depth position information.

In step S3705, the bookbinding application 104 executes overlapping determination processing for identifying any object overlapping the selected change-target object. More specifically, the bookbinding application 104 determines an overlapping state of respective objects. In the processing of step S3705, the bookbinding application 104 determines the overlapping of objects in a drawing region of each object or in a circumscribed rectangle corresponding to the drawing region.

Figure 37:
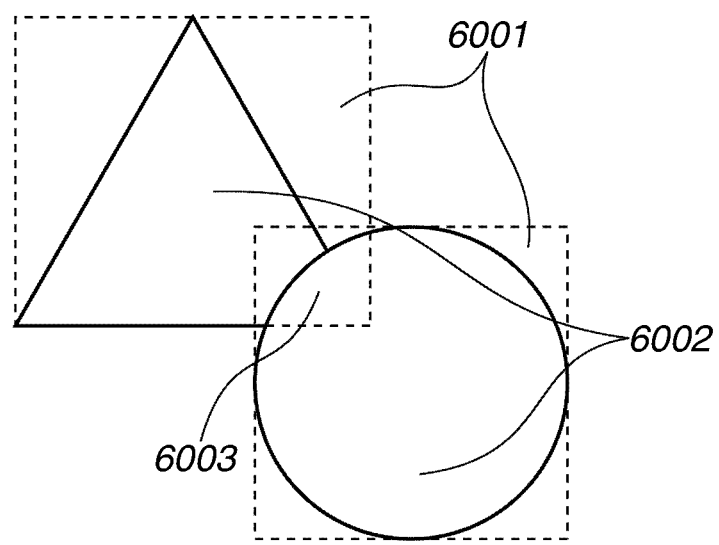
FIG. 37 illustrates an exemplary relationship between circumscribed rectangles and drawing regions for overlapping determination objects.

FIG. 37 illustrates an exemplary relationship between a circumscribed rectangle of an object and a drawing region. The bookbinding application 104 determines whether there is any overlap region based on the width and the height of two circumscribed rectangles 6001 of the respective objects.

If there is an overlap region 6003 where the circumscribed rectangles 6001 overlap, the bookbinding application 104 determines whether there is any dot being used to draw two objects in the region 6003 where two circumscribed rectangles 6001 overlap. If there is a dot being used to draw both objects, the bookbinding application 104 determines that two objects overlap. According to this method, the bookbinding application 104 can determine whether the actually drawn object regions 6002 overlap.

The object overlapping determination method may use the circumscribed rectangles 6001 of the objects. In this case, even when two objects do not actually overlap each other, the bookbinding application 104 determines that two objects overlap if their circumscribed rectangles overlap. Furthermore, the above-described overlapping determination method is a mere example. Any other method can be used to determine the overlapping of objects.

Figure 24A:
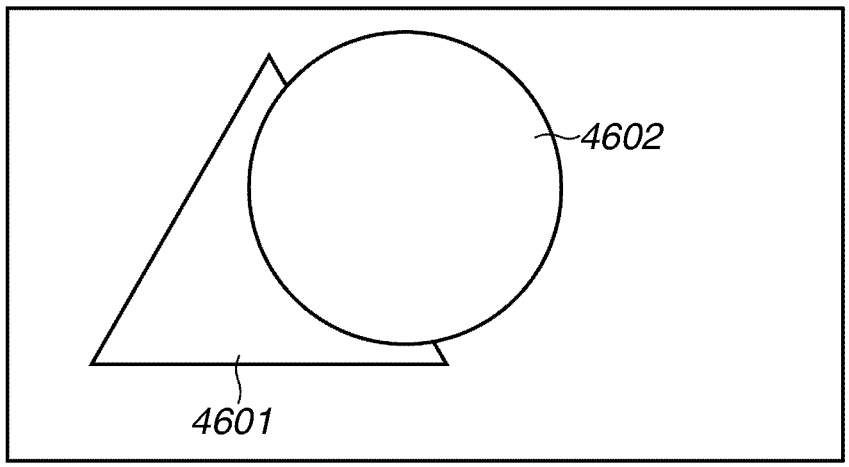
FIGS. 24A through 24C illustrate an exemplary procedure for determining overlapping of objects based on their drawing regions.
Figure 24B:
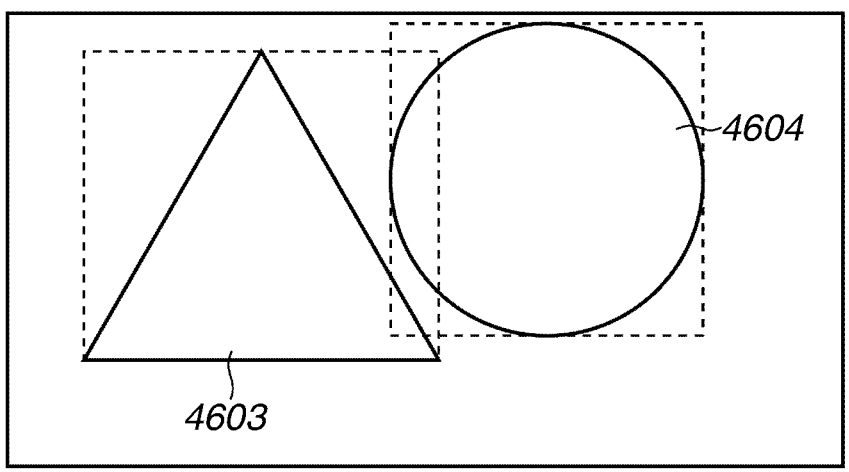
Figure 24C:
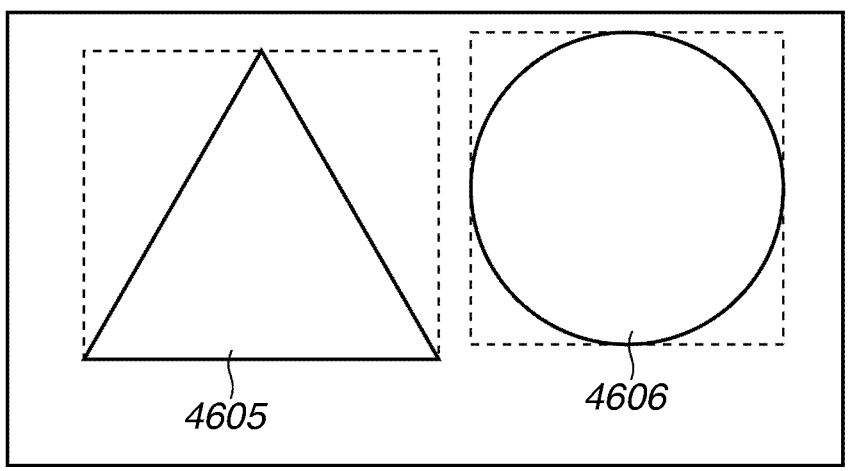

FIGS. 24A through 24C illustrate exemplary results of the overlapping determination performed based on the drawing regions of two objects. In FIG. 24A, two objects 4601 and 4602 have drawing regions overlapping each other. Therefore, the bookbinding application 104 determines that two objects 4601 and 4602 overlap each other.

In FIG. 24B, two objects 4603 and 4604 have drawing regions not overlapping each other, while the circumscribed rectangles of the objects 4603 and 4604 overlap each other. According to the examples illustrated in FIGS. 24A through 24C, the bookbinding application 104 executes the overlapping determination with reference to the regions where the objects are drawn. Thus, the bookbinding application 104 determines that two objects 4603 and 4604 do not overlap each other. In FIG. 24B, dotted lines represent the circumscribed rectangles surrounding the objects 4603 and 4604.

In FIG. 24C, two objects 4605 and 4606 do not overlap both in their drawing regions and in their circumscribed rectangles. Therefore, the bookbinding application 104 determines that two objects 4605 and 4606 do not overlap each other. In FIG. 24C, dotted lines represent the circumscribed rectangles surrounding the objects 4605 and 4606.

Figure 25A:
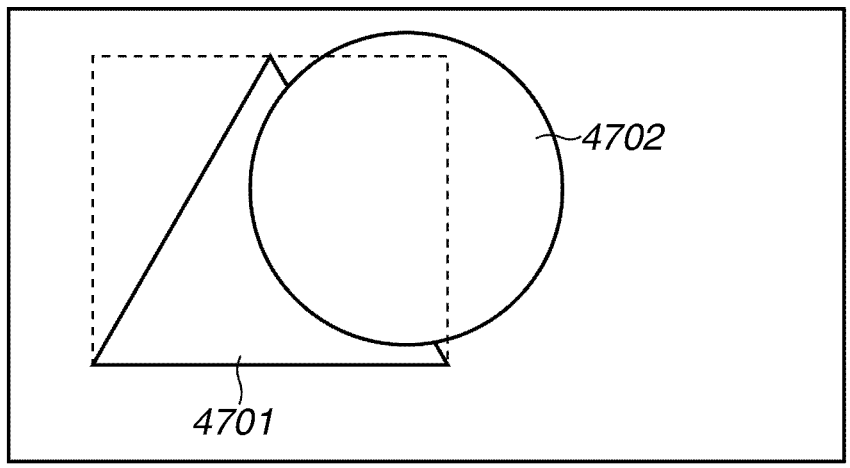
FIGS. 25A through 25C illustrate an exemplary procedure for determining overlapping of objects based on their circumscribed rectangles.
Figure 25B:
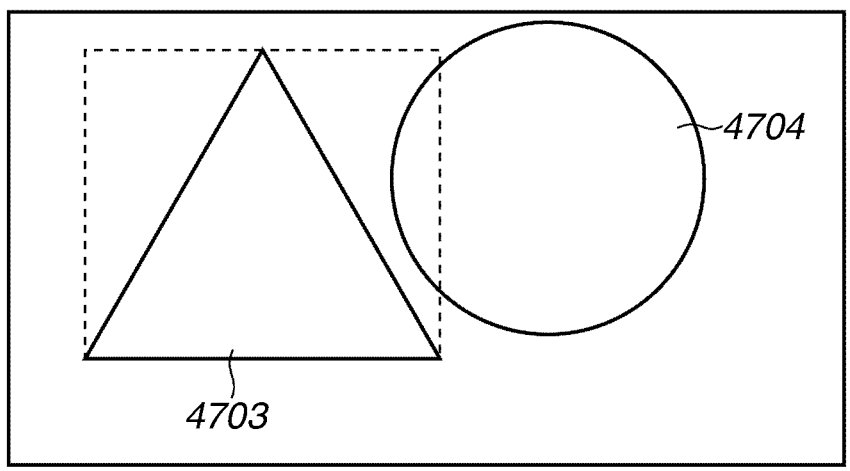
Figure 25C:
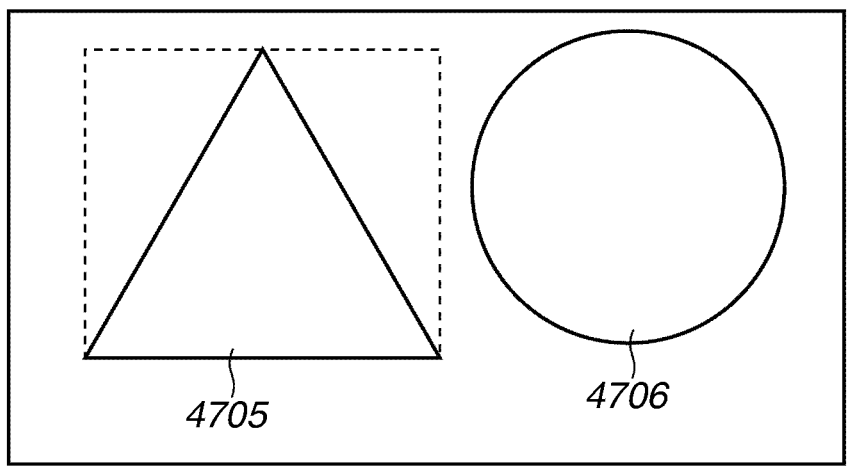

FIGS. 25A through 25C illustrate exemplary results of the overlapping determination performed based on the circumscribed rectangles of two objects.

In FIG. 25A, two objects 4701 and 4702 have drawing regions overlapping each other. Therefore, the bookbinding application 104 determines that two objects 4701 and 4702 overlap each other.

In FIG. 25B, two objects 4703 and 4704 have drawing regions not overlapping each other, while the circumscribed rectangles of the objects 4703 and 4704 overlap each other. According to the examples illustrated in FIGS. 25A through 25C, the bookbinding application 104 executes the overlapping determination with reference to the circumscribed regions of the object drawing regions. Thus, the bookbinding application 104 determines that two objects 4703 and 4704 overlap each other.

In FIG. 25C, two objects 4705 and 4706 do not overlap in their circumscribed rectangles. Therefore, the bookbinding application 104 determines that two objects 4705 and 4706 do not overlap each other.

Next, in step S3706, the bookbinding application 104 shifts a change-target object according to a user's instruction. More specifically, in step S3706, the bookbinding application 104 changes the position information indicating a horizontal or vertical position of the selected change-target object.

The bookbinding application 104 identifies an object which has overlapped the change-target object during an object shift operation and then has been released last from the overlapping state according to further shifting of the object. The bookbinding application 104 designates the identified object as an index object. Then, if the change-target object again overlaps the index object, the bookbinding application 104 changes the present depth position information so as to switch a depth positional relationship between the index object and the present depth position information.

In step S3707, at the timing when the change-target object shift operation is completed, the bookbinding application 104 sets the information stored as the present depth position information as the depth position information for the change-target object. Furthermore, the bookbinding application 104 updates the depth position information for the remaining objects according to the change caused by the shifting of the change-target object. The completion timing of the change-target object shift operation is, for example, completion of a user's drag-and-drop processing with the mouse.

After the depth position information change processing is completed, if the bookbinding application 104 determines that a position fix mode is not selected (NO in step S3708), the processing flow ends. On the other hand, if it is determined that position fix mode is selected (YES in step S3708), the processing flow proceeds to step S3709. In step S3709, the bookbinding application 104 returns the change-target object to the position where the object is located before the shift processing in step S3706 is executed.

More specifically, the bookbinding application 104 temporarily stores the position information of the change-target object before the bookbinding application 104 executes the shift processing of S3706. Thus, the bookbinding application 104 can execute the processing of step S3709 based on the temporarily stored position information.

A user can set the position fix mode by selecting a specific key. As described above, if the drawing order of a plurality of objects is changed according to the change in the position information of the change-target object, the bookbinding application 104 can change the position information of the change-target object to the previous position information set before the shift processing of step S3706 is executed.

Figure 26:
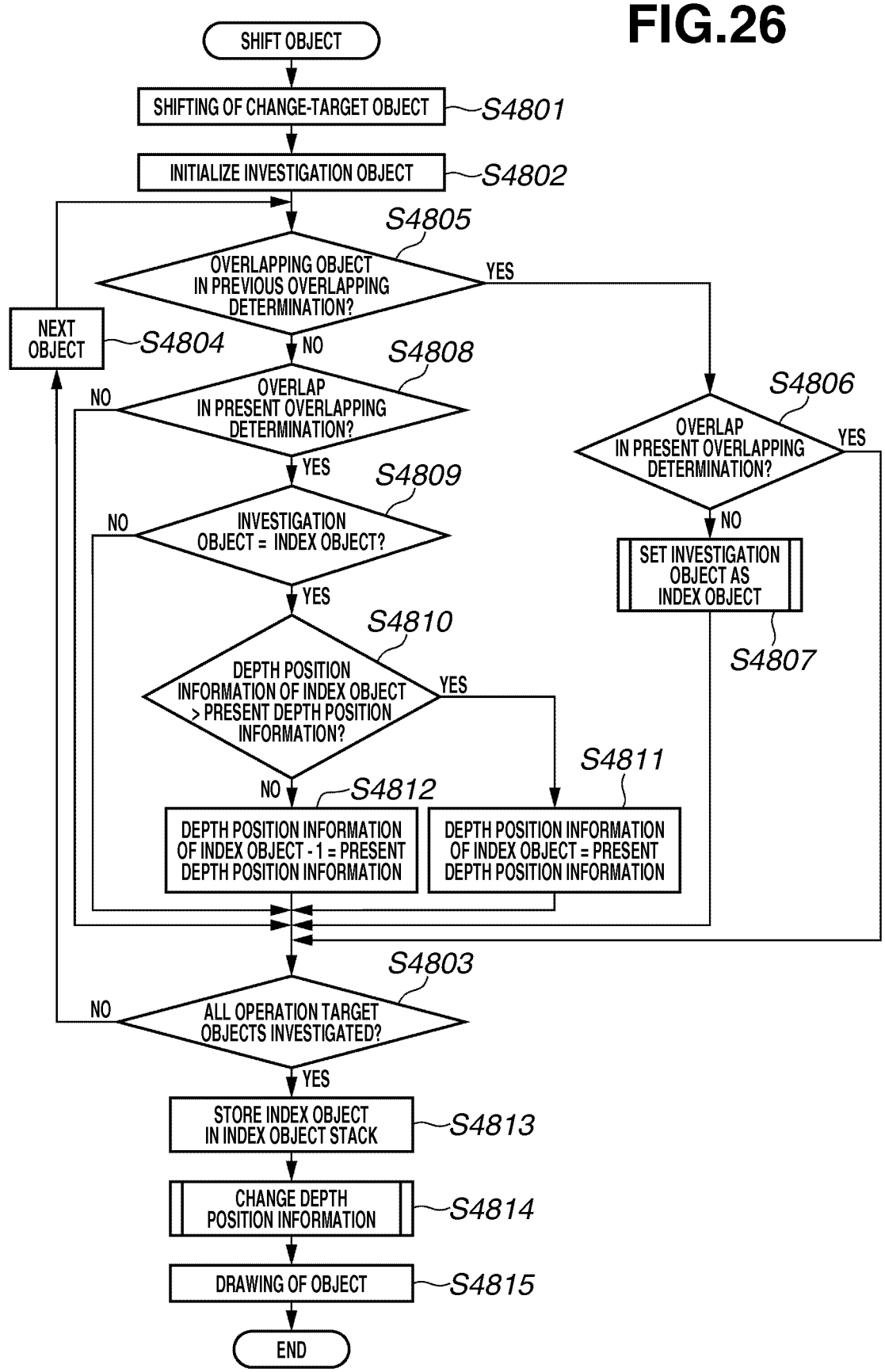
FIG. 26 is a flowchart illustrating details of exemplary object shift processing.

Next, details of the object shift processing will be described. FIG. 26 is a flowchart illustrating details of the processing in steps S3706 and S3707 of FIG. 18.

The bookbinding application 104 executes sequential processing illustrated in FIG. 26 in response to generation of a shift signal.

First, in step S4801, when a user inputs a shift signal with the mouse, the bookbinding application 104 shifts the position of a selected change-target object. Then, in step S4802, the bookbinding application 104 initializes an investigation object (i.e., determination target) to execute determination processing for determining whether the change-target object overlaps each operation target object after the change-target object is shifted to the location designated in step S4801.

In step S4805, the bookbinding application 104 determines whether the change-target object and the investigation object overlap in the previous overlapping determination. The previous overlapping determination is overlapping determination processing applied to the present investigation object in step S4805 of the previous cycle. The RAM 202 stores an overlapping determination result of each object.

Thus, the bookbinding application 104 can execute the processing of step S4805 by referring to the overlapping determination result of the present investigation object stored in the RAM 202. In the initial shifting operation, the overlapping determination executed in step S3705 is regarded as the previous overlapping determination.

If the change-target object and the investigation object overlap in the previous overlapping determination (YES in step S4805), the processing flow proceeds to step S4806. In step S4806, the bookbinding application 104 determines whether the shifted change-target object and the investigation object are presently overlapping.

If the change-target object having been shifted and the investigation object presently overlap (YES in step S4806), the processing flow proceeds to S4803. On the other hand, if the shifted change-target object and the investigation object do not presently overlap (NO in step S4806), the processing flow proceeds to step S4807. In step S4807, the bookbinding application 104 sets the investigation object as an index object. In the present embodiment, the index object is an object regarded as a reference when the bookbinding application 104 changes the depth position information for the change-target object.

More specifically, the bookbinding application 104 selects an object different from a change-target object selected by a user on the operation screen as an object regarded as a reference when the bookbinding application 104 changes the drawing order of the change-target object.

Figure 27:
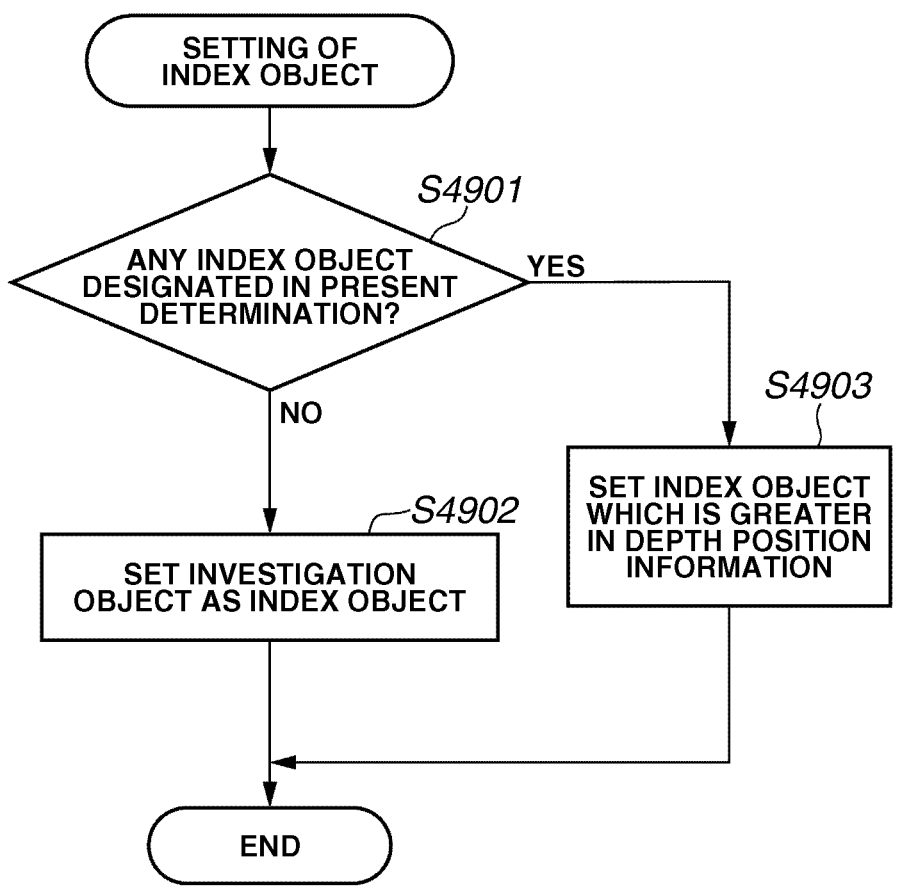
FIG. 27 is a flowchart illustrating details of exemplary index object setting processing.

FIG. 27 is a flowchart illustrating exemplary index object setting processing. First, in S4901, the bookbinding application 104 determines whether any index object is set for another object in the object shift processing of step S4801. If there is no object being set as the index object (NO in step S4901), the processing flow proceeds to step S4902. In step S4902, the bookbinding application 104 sets, as an index object, the investigation object which is determined "NO" in step S4806 (FIG. 26).

On the other hand, if there is any index object having been already set (YES in step S4901), the processing flow proceeds to step S4903. In step S4903, the bookbinding application 104 sets, as an index object, an object which is greater in the depth position information (i.e., a foremost object displayed on the UI). In this case, the bookbinding application 104 can differentiate the display for the index object on the UI so that a user can easily identify the index object. The processing illustrated in FIG. 27 is effective when the change-target object has been released from an overlapping state with a plurality of operation target objects during a shift operation.

If the bookbinding application 104 determines that the present investigation object does not overlap the change-target object in the previous overlapping determination (NO in step S4805), the processing flow proceeds to step S4808. In step S4808, the bookbinding application 104 determines whether the shifted change-target object overlaps the investigation object.

If the bookbinding application 104 determines that the shifted change-target object does not overlap the investigation object (NO in step S4808), the processing flow proceeds to S4803. If the bookbinding application 104 determines that the shifted change-target object overlaps the investigation object (YES in step S4808), the processing flow proceeds to step S4809.

In step S4809, the bookbinding application 104 determines whether the present investigation object is the index object. If the bookbinding application 104 determines that the present investigation object is not the index object (NO in step S4809), the processing flow proceeds to step S4803. On the other hand, if the present investigation object is the index object (YES in step S4809), the processing flow proceeds to step S4810.

In step S4810, the bookbinding application 104 compares the depth position information for the index object with the present depth position information. More specifically, the bookbinding application 104 determines whether the change-target object is drawn in front of or behind the index object according to the drawing order of a plurality of objects.

If the bookbinding application 104 determines that the depth position information of the index object is greater that the present depth position information (YES in step S4810), the processing flow proceeds to step S4811. In step S4811, the bookbinding application 104 stores the depth position information of the index object as the present depth position information. More specifically, when the bookbinding application 104 determines that the index object is positioned in front of the change-target object, the bookbinding application 104 stores the depth position information of the index object as the present depth position information. Processing then proceeds to step S4803.

On the other hand, if the depth position information of the index object is less than or equal to the present depth position information (NO in step S4810), the processing flow proceeds to step S4812. In step S4812, the bookbinding application 104 subtracts "1" from the depth position information of the index object and stores the obtained depth position information as the present depth position information. More specifically, when the bookbinding application 104 determines that the index object is positioned behind the change-target object, the bookbinding application 104 stores the present depth position information which is equal to the depth position information obtained by subtracting "1" from the depth position information of the index object. Processing then proceeds to step S4803.

In step S4803, the bookbinding application 104 determines whether the sequential processing of steps S4805 through S4812 has been completed for all of the operation target objects. If the bookbinding application 104 determines that the sequential processing of steps S4805 through S4812 has not yet been completed for all of the operation target objects (NO in step S4803), the processing flow proceeds to step S4804. In step S4804, the bookbinding application 104 designates the next operation target object as an investigation object and then returns to step S4805 to repeat the above-described processing.

If the determination result is YES in step S4803, the processing flow proceeds to step S4813. In step S4813, the bookbinding application 104 stores information on the index object and the present depth position information, as index object information, in an index object stack.

Figure 28:
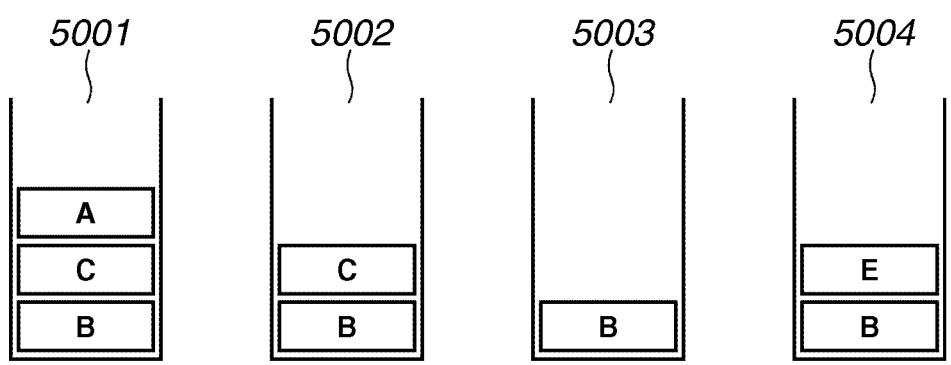
FIG. 28 illustrates exemplary states of an index object stack.

FIG. 28 illustrates an exemplary index object stack having a stack storage structure according to which information can be stored and extracted according to a first-in last-out method. The information is erased if extracted from the stack. Thus, the information is successively erased from the top of the stack if extraction processing is continuously performed.

In FIG. 28, an exemplary state 5001 illustrates information of three objects "B", "C", and "A" being stored in this order. The order indicates the index objects having been changed during an object shift operation.

More specifically, the object "B" is first set as an index object and the objects "C" and "A" are successively set as index objects. An exemplary state 5002 illustrates the information of objects "B" and "C" remaining after the information of the object "A" is extracted. An exemplary state 5003 illustrates the information of the object "B" remaining after the information of the object "C" is extracted. An exemplary state 5004 illustrates information relating to an object "E" newly stored on the information of the object "B."

Referring back to FIG. 26, in step S4814, the bookbinding application 104 changes the depth position information as described later with reference to the flowchart of FIG. 30. If the bookbinding application 104 determines that the change-target object is drawn behind the index object, the bookbinding application 104 changes the drawing order of a plurality of objects so that the change-target object can be drawn in front of the index object.

On the other hand, if the bookbinding application 104 determines that the change-target object is drawn in front of the index object, the bookbinding application 104 changes the drawing order of a plurality of objects so that the change-target object is drawn behind the index object.

In step S4815, the bookbinding application 104 draws the objects according to the depth position information updated in step S4814. Thus, the bookbinding application 104 draws the objects in the order of smallest to largest in the depth position information set for the respective objects.

Next, the processing corresponding to the flowchart of FIG. 26 will be described below with reference to FIGS. 29A through 29D. FIGS. 29A through 29D illustrate an object 5101 designated as a change-target object and two objects 5102 and 5103 designated as operation target objects. The object 5102 is a triangular object. The object 5103 is a rectangular object.

In an initial state illustrated in FIG. 29A, the change-target object 5101 overlaps the objects 5102 and 5103. If a user designates the change-target object 5101 and executes the shift processing (refer to step S4801), the bookbinding application 104 specifies an initial investigation object (refer to step S4802). In FIG. 29A, the object 5102 is set as an initial investigation object.

FIG. 29B illustrates an exemplary state where the change-target object 5101 is shifted rightward from the position illustrated in FIG. 29A, so that the object 5102 is separated from the change-target object 5101. More specifically, the bookbinding application 104 determines that the change-target object 5101 and the present investigation object 5102 are objects overlapping in the previous overlapping determination (refer to step S4805). The state illustrated in FIG. 29A corresponds to the previous overlapping determination.

Then, in step S4806, the bookbinding application 104 determines that the change-target object 5101 does not presently overlap the investigation object 5102 (i.e., NO in step S4806). As a result, in FIG. 29B, the investigation object 5102 can be identified as an index object. Subsequently, in step S4804, the bookbinding application 104 designates the object 5103 as an investigation object.

In FIG. 29B, the investigation object 5103 overlaps the change-target object 5101 in the previous overlapping determination (FIG. 29A, step S4805) and the present overlapping determination (FIG. 29B, step S4806). Accordingly, the investigation object 5103 cannot be identified as an index object.

FIG. 29C illustrates an exemplary state where the change-target object 5101 is further shifted rightward from the position illustrated in FIG. 29B. In the state illustrated in FIG. 29C, the object 5103 is separated from the change-target object 5101. The bookbinding application 104, if it executes the processing of FIG. 26, determines that the object 5102 does not overlap the change-target object 5101 in both the previous overlapping determination (FIG. 29B) and the present overlapping determination (FIG. 29C).

Thus, the object 5102 cannot be identified as an index object. On the other hand, the object 5103 overlaps the change-target object 5101 in the previous overlapping determination (FIG. 29B, YES in step S4805) and does not overlap the change-target object 5101 in the present overlapping determination (FIG. 29C, NO in step S4806). Thus, the object 5103 can be identified as an index object.

More specifically, the bookbinding application 104 determines whether an arbitrary object having previously overlapped the change-target object is released from an overlapping state due to a position information change of the change-target object. If there is an object satisfying the conditions of the above determination, the bookbinding application 104 specifies this object as an index object.

FIG. 29D illustrates an exemplary state where the change-target object 5101 is shifted leftward from the position of FIG. 29C. In this condition, the change-target object 5101 overlaps the object 5103. The bookbinding application 104 determines that the change-target object 5101 does not overlap the investigation object 5103 in the previous overlapping determination (FIG. 29C, NO in step S4805) and overlaps the investigation object 5103 in the present overlapping determination (FIG. 29D, YES in step S4808).

Then, the bookbinding application 104 determines whether the investigation object 5103 is an index object (refer to step S4809). In this case, the bookbinding application 104 determines that the investigation object 5103 is an index object (YES in step S4809). In step S4810, the bookbinding application 104 compares the depth position information of the index object with the present depth position information.

As described with reference to step S3704, when a change-target object is selected, the bookbinding application 104 stores the depth position information of the change-target object as present depth position information. More specifically, in FIG. 29A, the depth position information of the change-target object 5101 is "3" and the depth position information of the index object 5103 is "1."

Therefore, the bookbinding application 104 determines that the depth position information of the index object 5103 is smaller than the present depth position information (i.e., NO in step S4810). The bookbinding application 104 subtracts "1" from the depth position information of the index object and stores the obtained value as the present depth position information (refer to step S4812). As a result, in FIG. 29D, the present depth position information becomes "0."

In FIG. 29D, the bookbinding application 104 stores the index object 5103 into the index object stack because the bookbinding application 104 has completed the determination processing for all of the operation target objects. In this case, the bookbinding application 104 stores the present depth position information "0" in association with the index object 5103.

More specifically, the bookbinding application 104 determines whether the index object having been released from an overlapping state (corresponding to the object 5103 in FIGS. 29A through 29C) is again changed into an overlapping state (refer to FIG. 29D) due to a position information change of the change-target object. If the index object satisfies the above-described conditions, the bookbinding application 104 changes the drawing order according to the determination result of step S4810.

The bookbinding application 104 performs the processing for drawing all of the objects in the following manner.

Figure 30:
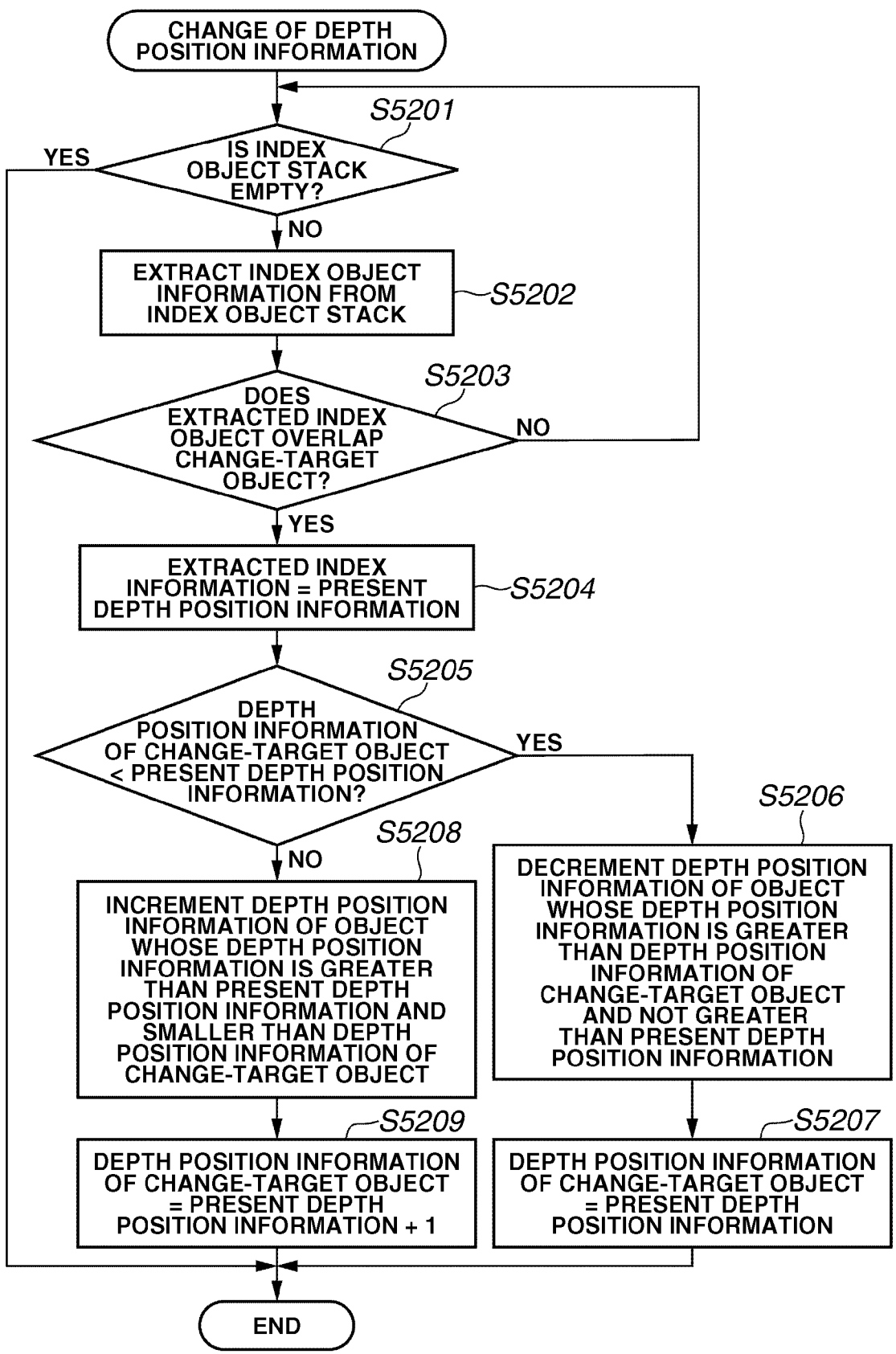
FIG. 30 is a flowchart illustrating details of exemplary depth position information changing processing.

FIG. 30 is a flowchart illustrating details of the depth position information change processing in step S3707.

First, in step S5201, the bookbinding application 104 determines whether the index object stack is empty. If the index object stack is empty (YES in step S5201), the bookbinding application 104 terminates this routine because the depth position information change processing is unnecessary.

If the bookbinding application 104 determines that the index object stack is not empty (NO in step S5201), the processing flow proceeds to step S5202. In step S5202, the bookbinding application 104 extracts index object information from the index object stack. Then, in step S5203, the bookbinding application 104 determines whether the index object extracted from the index object stack overlaps the change-target object.

If the index object does not overlap the change-target object (NO in step S5203), the processing flow returns to step S5201. In step S5202, the bookbinding application 104 extracts the next index object information from the index object stack. If there is no overlapping index object (YES in step S5201), the bookbinding application 104 terminates this routine.

Figure 31:
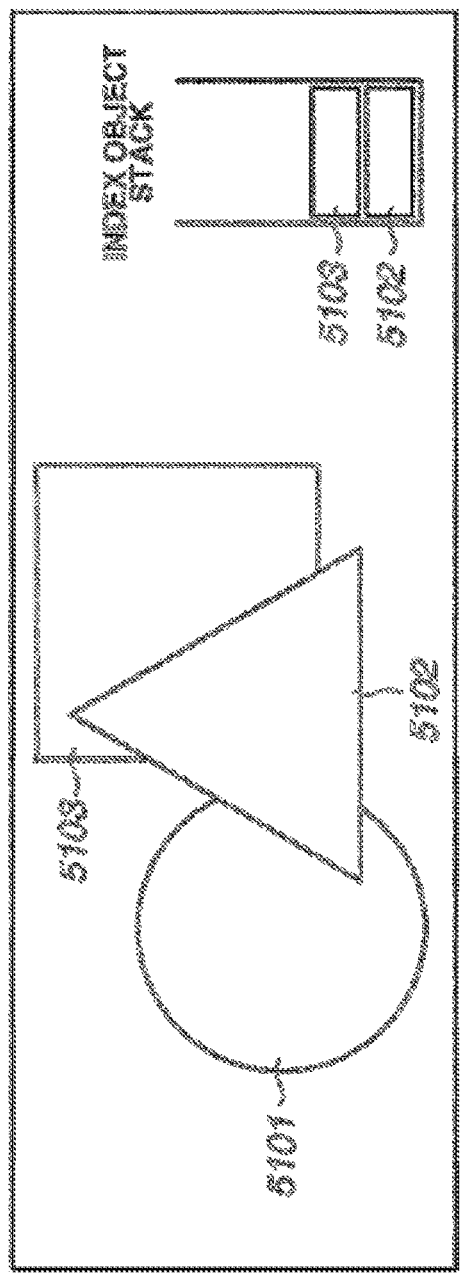
FIG. 31 illustrates extraction of information from the index object stack in the depth position information changing processing.

Exemplary determination processing of step S5203 will be described with reference to an example illustrated in FIG. 31. FIG. 31 illustrates an exemplary state where the change-target object 5101 is further shifted leftward from the position of FIG. 29D. In the condition of FIG. 31, if the bookbinding application 104 extracts index object information from the index object stack, the bookbinding application 104 can obtain the index object information of the object 5103. The object 5103 information then is erased from the stack since the object 5103 was extracted from the stack.

However, the object 5103 does not overlap the change-target object 5101 (NO at step S5203 FIG. 30). Therefore, since the index object stack still has the index object information of the object 5102 (NO at step S5201), the bookbinding application 104 extracts the next index object information from the index object stack (at step S5202). Namely, the bookbinding application 104 can extract the index object information of the object 5102, which has been set as an index object prior to the object 5103 (see FIG. 31 index object stack).

If the bookbinding application 104 determines that the index object extracted from the index object stack overlaps the change-target object (YES in step S5203), the processing flow proceeds to step S5204. In step S5204, the bookbinding application 104 stores the depth position information having been stored in association with this index object as the present depth position information.

Then, in step S5205, the bookbinding application 104 compares the present depth position information with the depth position information of the change-target object. If the depth position information of the change-target object is smaller than the present depth position information (YES in step S5205), the processing flow proceeds to step S5206. In step S5206, the bookbinding application 104 changes the depth position information of any object disposed in front of the change-target object and behind the present depth position information.

More specifically, the bookbinding application 104 decrements (i.e., decreases by "1") the depth position information of any object whose depth position information is greater than the depth position information of the change-target object and is equal to or less than the present depth position information. Then, in step S5207, the bookbinding application 104 sets the changed depth position information of the change-target object to the present depth position information.

If there are plural change-target objects, the bookbinding application 104 subtracts the number of change-target objects from the depth position information of an object which is greater than a maximum value in the depth position information for the plurality of change-target objects and equal to or less than the present depth position information.

Then, the bookbinding application 104 sets the depth position information of a foremost change-target object as the present depth position information, and changes the order of the remaining change-target objects so as to be continuously disposed while keeping the order of depth position information.

If the bookbinding application 104 determines that the depth position information of the change-target object is greater than or equal to the present depth position information (NO in step S5205), the processing flow proceeds to step S5208. In step S5208, the bookbinding application 104 increments (i.e., increases by "1") the depth position information of any object whose depth position information is greater than the present depth position information and smaller than the depth position information of the change-target object.

Then, in step S5209, the bookbinding application 104 sets the present depth position information added with "1" as the depth position information of the change-target object. If there are plural change-target objects, the bookbinding application 104 adds the number of change-target objects to the depth position information of an object which is greater than the present depth position information and less than depth position information of the change-target object.

Then, the bookbinding application 104 sets the depth position information of a rearmost change-target object as the present depth position information, and changes the order of the remaining change-target objects so as to be continuously disposed while keeping the order of depth position information.

The processing of FIG. 30 will be described below in detail with reference to FIGS. 29A through 29D.

According to the example illustrated in FIG. 29D, the index object stack stores information of the index object 5103 at a top position (i.e., NO in step S5201). In step S5202, the bookbinding application 104 extracts the information of the index object 5103. In FIG. 29D, the change-target object 5101 and the index object 5103 overlap (i.e., YES in step S5203).

Therefore, the bookbinding application 104 stores the depth position information associated with the index object extracted from the index object stack as the present depth position information (refer to step S5204). As described with reference to FIGS. 29A through 29D, the present depth position information in the state of FIG. 29D is equal to "0." Therefore, the bookbinding application 104 sets "0" for the present depth position information in step S5204.

Next, in step S5205, the bookbinding application 104 compares the depth position information of the change-target object 5101 with the present depth position information. According to the example illustrated in FIGS. 29A through 29D, the depth position information of the change-target object 5101 is "3." Therefore, the bookbinding application 104 determines that the change-target object 5101 is positioned in front of the present depth position information (0) (i.e., NO in step S5205).

Then, the bookbinding application 104 specifies an object whose depth position information is greater than the present depth position information "0" and less than the depth position information "3" of the change-target object 5101. In this case, the depth position information of the object 5102 is "2," which is greater than the present depth position information "0" and less than the depth position information "3" of the change-target object 5101. Therefore, the bookbinding application 104 adds "1" to the depth position information for the object 5102. Namely, the depth position information for the object 5102 becomes "3."

Furthermore, the depth position information of the object 5103 is "1," which is greater than the present depth position information "0" and less than the depth position information "3" of the change-target object 5101. Therefore, the bookbinding application 104 adds "1" to the depth position information for the object 5103. Namely, the depth position information for the object 5103 becomes "2" (refer to step S5208).

On the other hand, the bookbinding application 104 adds "1" to the present depth position information "0" and sets the depth position information for the change-target object 5101 which is equal to "1" (refer to step S5209).

When the bookbinding application 104 executes drawing processing based on the result of the processing illustrated in FIGS. 18, 26, 27, and 30, the bookbinding application 104 can easily change the drawing order of a plurality of objects with reference to a designated change-target object as illustrated in FIG. 29D.

As described above, if a user selects an object (i.e., a change-target object corresponding to a first object), the bookbinding application 104 can easily change the drawing order of this object to a different order by executing the processing of FIGS. 18, 21, 26, 27, and 30. Furthermore, a user can change the drawing order of an object which is displayed on the operation screen. Thus, the operability can be improved.

Next, a continuous determination mode in the depth change mode will be described. When the continuous determination mode is set, the bookbinding application 104 executes only one time the present depth position information change processing (i.e., the processing of steps S4811 and S4812) during an object shift operation.

Then, if the continuous determination mode is set and the drawing order is changed so that a change-target object is drawn in front of an index object according to a changed drawing order, the bookbinding application 104 stores information indicating that forward shift processing has been applied to the change-target object.

After the bookbinding application 104 stores the information indicating that the forward shift processing has been executed, if the change-target object is shifted and overlaps another object, the bookbinding application 104 changes the drawing order according to the stored information. The bookbinding application 104 executes rearward shift processing in a similar manner.

More specifically, the bookbinding application 104 stores a depth shifting direction of the change-target object. If the shifting direction is "forward", the bookbinding application 104 changes the depth position information of the change-target object so that the change-target object is positioned at a foremost side compared to the overlapping objects.

On the other hand, if the change-target object is shifted rearward as a result of once-performed processing for changing the present depth position information, the bookbinding application 104 changes the depth position information of the change-target object so that the change-target object is positioned at a rearmost side compared to the overlapping objects.

An exemplary UI enabling a user to select the continuous determination mode will be described. If a user executes a specific operation, the bookbinding application 104 displays a UI that enables the user to select a desired determination mode. If the user selects an ordinary determination mode, the bookbinding application 104 performs determination based on the method described with reference to the flowchart of FIG. 26. If a user selects the continuous determination mode, the bookbinding application 104 performs determination based on a method described with reference to the flowchart of FIG. 35.

Next, operational differences between the ordinary determination mode and the continuous determination mode will be described with reference to FIGS. 32A and 32B through 34.

Figure 32A:
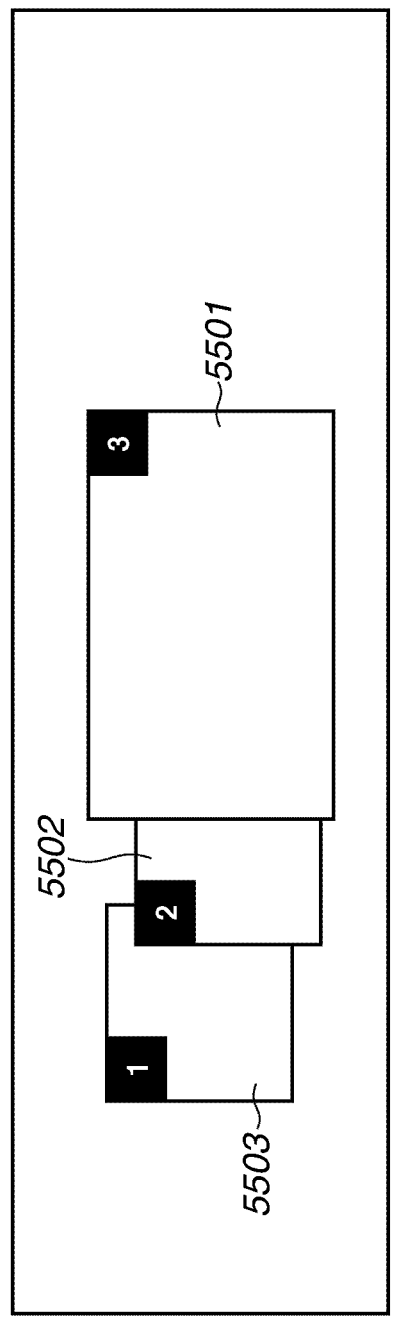
FIGS. 32A and 32B are UI screens illustrating an exemplary operation that can be performed differently depending on a selected determination mode.
Figure 32B:
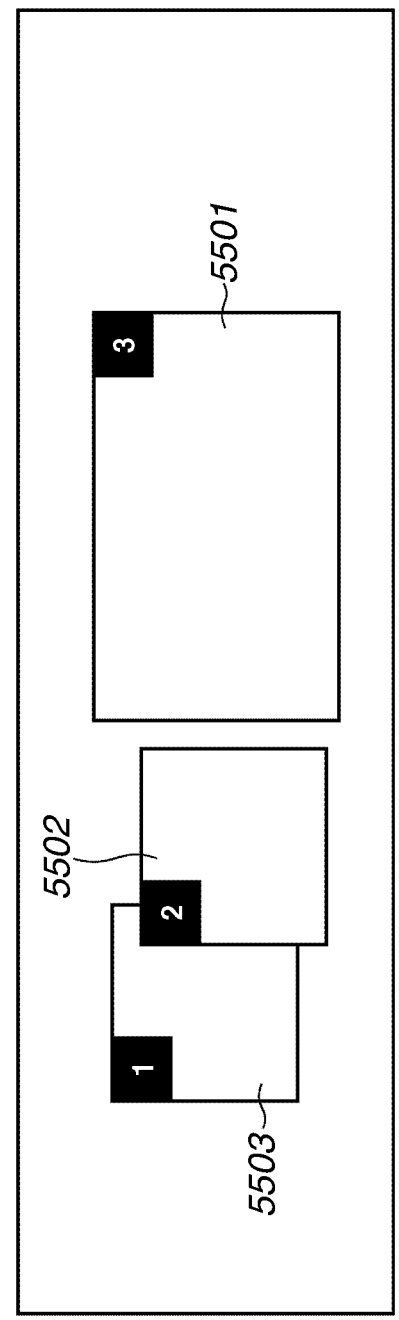

It is now assumed that a change-target object 5501 is shifted from the position illustrated in FIG. 32A to the position illustrated in FIG. 32B. Then, the change-target object 5501 is shifted to a position overlapping the objects 5502 and 5503. FIG. 33 illustrates an exemplary state according to the ordinary determination mode. FIG. 34 illustrates an exemplary state according to the continuous determination mode.

In the ordinary determination mode (refer to FIG. 33), the object 5502 is an index object and, therefore, the bookbinding application 104 switches the positional relationship (depth position information) between the change-target object 5501 and the object 5502. As a result, the change-target object 5501 is disposed between the object 5502 and the object 5503.

In the continuous determination mode (refer to FIG. 34), the object 5502 is an index object and, therefore, the bookbinding application 104 switches the positional relationship (depth position information) between the change-target object 5501 and the object 5502. In this case, the bookbinding application 104 stores information indicating the positional relationship (i.e., foreside or rear-side) between the change-target object and the index object.

Then, when the bookbinding application 104 switches the positional relationship between the change-target object and the index object, the bookbinding application 104 applies the same switching processing to another investigation object(s). According to the example illustrated in FIG. 34, the bookbinding application 104 switches the positional relationship so that the change-target object 5501 is disposed behind the index object 5502. Therefore, the bookbinding application 104 subsequently switches the drawing order so that the change-target object 5501 is disposed behind the investigation object 5503.

Figure 35:
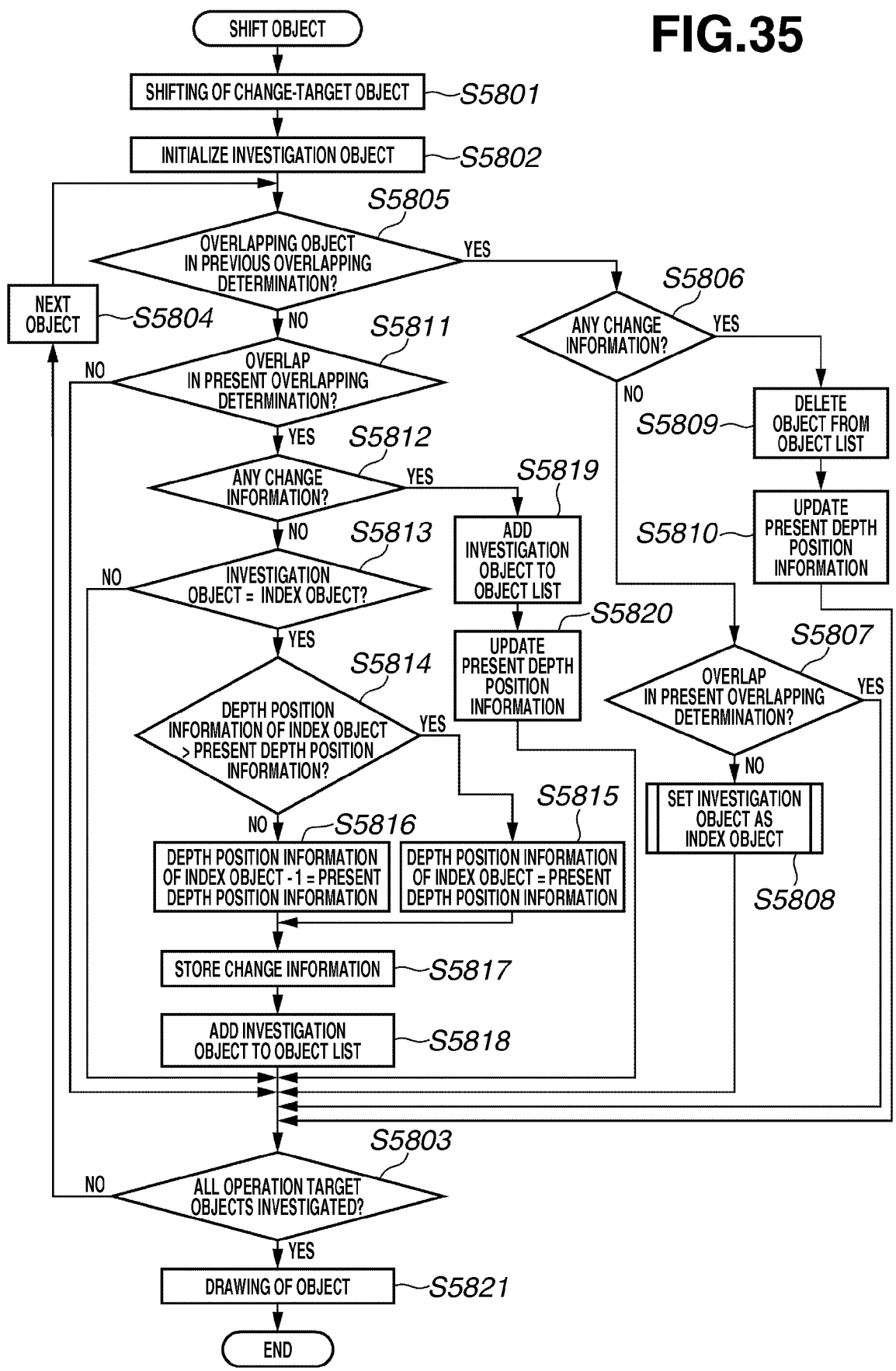
FIG. 35 is a flowchart illustrating details of exemplary object shift processing in the continuous determination mode.

FIG. 35 is a flowchart illustrating exemplary object shift processing (refer to step S3706) performed in the continuous determination mode. The flowchart illustrated in FIG. 18 is applicable to every mode. Furthermore, the flowchart of FIG. 35 is partly similar to the flowchart of FIG. 26.

The processing of steps S5801-S5805, S5807, S5808, S5811, S5813-S5816 and S5821 is similar to the above-described processing of steps S4801-S4812 and S4815, respectively, in FIG. 26, and therefore will not be repeated in the following description.

In step S5817, the bookbinding application 104 stores the processing result in step S5815 or S5816 as change information. The change information is information indicating either "shift forward" or "shift rearward." More specifically, after the processing of step S5815 is executed, the bookbinding application 104 stores the change information being set to "shift forward." On the other hand, after the processing of step S5816 is executed, the bookbinding application 104 stores the change information being set to "shift rearward." Then, in step S5818, the bookbinding application 104 stores the present investigation object into an object list.

Subsequently, the bookbinding application 104 adds any object overlapping the change-target object into the object list (refer to steps S5812 and S5819) and deletes any object being released from an overlapping state (refer to steps S5806 and S5809). If the change information is once set for an object, the object can be added or deleted to or from the object list through the processing of steps S5819 and S5809.

After the bookbinding application 104 adds an investigation object to the object list in step S5819, the bookbinding application 104 compares the present depth position information with the depth position information of the added object and updates the present depth position information (refer to step S5820).

More specifically, if the change information is information indicating "shift forward" and the depth position information of the added object is greater than the present depth position information, the bookbinding application 104 sets the depth position information of the added object as the present depth position information.

On the other hand, if the change information is information indicating "shift rearward" and the depth position information of the added object is less than the present depth position information, the bookbinding application 104 subtracts "1" from the depth position information of the added object and sets the obtained value as the present depth position information.

When the bookbinding application 104 deletes an investigation object from the object list (refer to step S5809), the bookbinding application 104 compares the depth position information of the deleted object with the present depth position information and updates the present depth position information (refer to step S5810).

If the updated information is information indicating "shift forward" and the present depth position information is equal to the depth position information of the deleted object, the bookbinding application 104 identifies a maximum value of the depth position information for the objects stored in the object list and sets the identified depth position information as the present depth position information.

If the updated information is information indicating "shift rearward" and the depth position information of the deleted object is equal to "the present depth position information+1", the bookbinding application 104 identifies a minimum value of the depth position information for the objects stored in the object list and sets a value obtained by subtracting "1" from the identified minimum depth position information as the present depth position information.

If no object to be deleted is present in the object list, the bookbinding application 104 skips the processing of step S5810.

Figure 36:
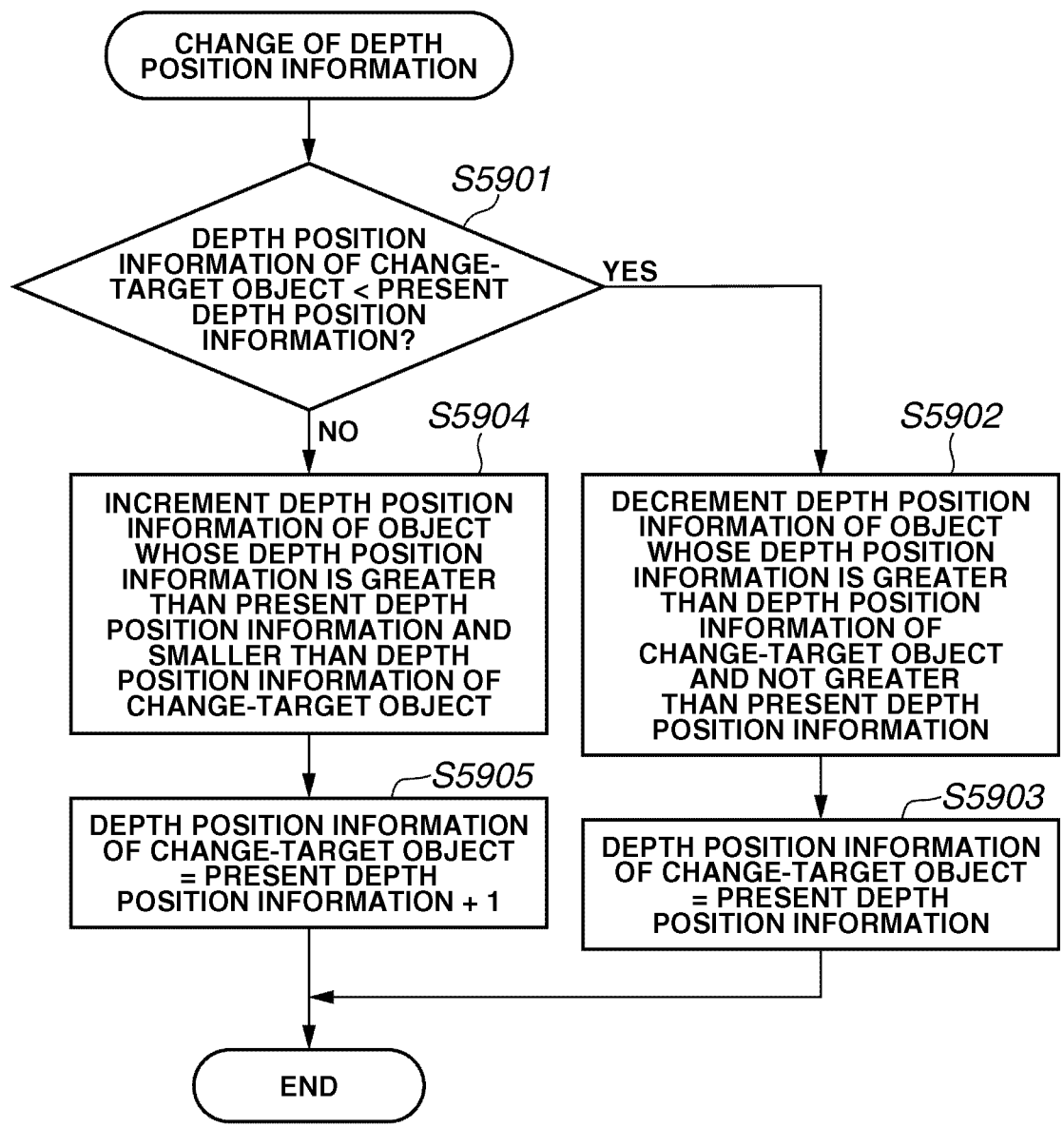
FIG. 36 is a flowchart illustrating details of exemplary depth position information changing processing in the continuous determination mode.

FIG. 36 is a flowchart illustrating details of the depth position information change processing (refer to step S3707) in the continuous determination mode. The flowchart illustrated in FIG. 36 is similar to the flowchart of FIG. 30, except the processing of steps S5201 through S5204. In other words, steps S5901 through S5905 are similar to steps S5205 through S5209, respectively.

The bookbinding application 104 executes the processing of FIGS. 35 and 36 in the following situation.

Figure 38:
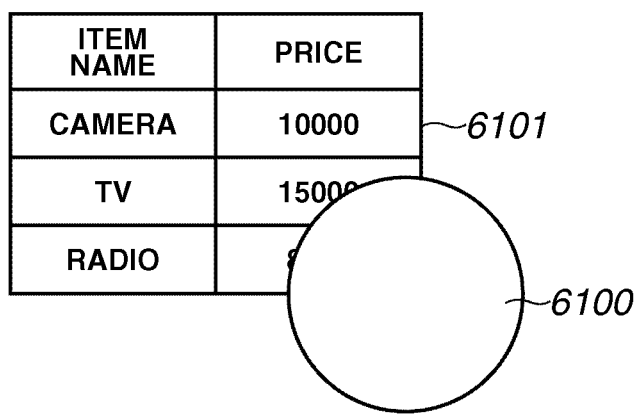
FIG. 38 illustrates an exemplary effect according to the continuous determination mode.

FIG. 38 illustrates an object 6100 disposed on a table formed by a total of eight lines and text data. A vertical line object 6101 is disposed at a foremost side compared to other lines of the table. In this condition, it is assumed that the ordinary determination mode is selected by a user to dispose the object 6100 behind the table and the bookbinding application 104 executes the processing of FIGS. 26, 27, and 30.

Figure 39:
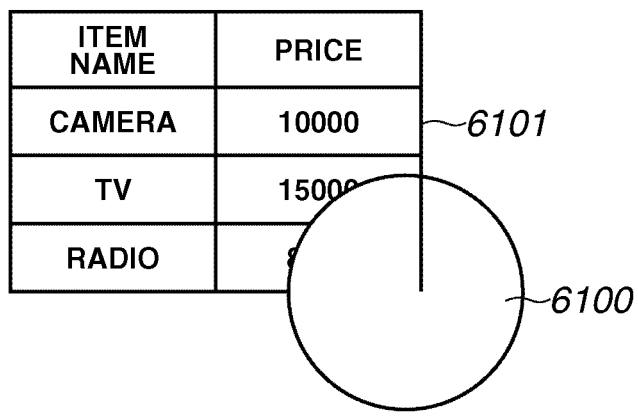
FIG. 39 illustrates an exemplary effect according to the continuous determination mode.

If a user selects and shifts the object 6100 rightward to separate the object 6100 from the table object (i.e., releases the object 6100 from an overlapping state), the vertical line object 6101 becomes an index object. Then, if the change-target object 6100 is shifted leftward, the change-target object 6100 is disposed behind the vertical line object 6101. However, the change-target object 6100 is still disposed in front of other objects as illustrated in FIG. 39.

However, when the bookbinding application 104 executes the processing of FIGS. 35 and 36, the change-target object 6100 can be disposed behind any other overlapping objects as a result of further execution of the shift processing applied to the change-target object 6100. Therefore, the present embodiment can eliminate such an output result as illustrated in FIG. 39, which is not intended by a user.

FIG. 40 is a block diagram illustrating an information processing apparatus configured to display a plurality of objects on an operation screen according to the drawing order of respective objects.

A first selection unit 4001 selects a first object from the plurality of objects displayed on the operation screen. A second selection 4002 unit selects a second object which is an object different from the first object and is used as a reference when the drawing order of the first object is changed. A drawing order determination unit 4003 determines whether the first object is drawn in front of the second object when the first and second objects are drawn according to the drawing order of the plurality of objects. Furthermore, the drawing order determination unit 4003 determines whether the first object is drawn behind the second object when the first and second objects are drawn according to the drawing order of the plurality of objects.

A drawing order changing unit 4004 changes the drawing order of the plurality of objects so that the first object is drawn behind the second object if the drawing order determination unit 4003 determines that the first object is drawn in front of the second object. Furthermore, the drawing order changing unit 4004 changes the drawing order of the plurality of objects so that the first object is drawn in front of the second object if the drawing order determination unit 4003 determines that the first object is drawn behind the second object.

A position changing unit 4005 changes position information indicating a horizontal or vertical position of the first object selected by the first selection unit 4001. An overlapping determination unit 4006 determines an overlapping state of respective objects. A determination mode setting unit 4007 sets a continuous determination mode for causing the drawing order determination unit 4003 to continuously operate.

A storage unit 4008 stores information indicating that forward shift processing has been applied to the first object when the continuous determination mode is set and the drawing order has been changed so that the first object is drawn in front of the second object according to the drawing order changed by the drawing order changing unit 4004. Furthermore, the storage unit 4008 stores information indicating that rearward shift processing has been applied to the first object when the continuous determination mode is set and the drawing order has been changed so that the first object is drawn behind the second object according to the drawing order changed by the drawing order changing unit 4004.

Software program code for realizing the functions of the above-described exemplary embodiments can be supplied to a system or an apparatus including various devices. The flowcharts described in the exemplary embodiments correspond to the software program code.

A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a digital versatile disc (DVD) (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses world wide web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

As described above, in a situation where a plurality of objects are disposed, the exemplary embodiments of the present invention can easily output a user's designated object according to a drawing order, thus improving user's operability.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-157469 filed Jun. 6, 2006, which is hereby incorporated by reference herein in its entirety.

What is claimed is:

1. An information processing apparatus comprising:
a processor;
a display unit configured to display, on a display apparatus, a group of objects having a first object and a second object, wherein at least a part of the first object and at least a part of the second object are overlapped;
a selection unit configured to select, from the displayed group of objects displayed on the display apparatus, the first object as a target to be shifted; and
a change unit configured to execute processing, as a change-target object shift operation, to change a drawing order of the group of objects,
wherein, when (i) the first object is arranged in a first drawing order in front of the second object to overlap the second object and (ii) is shifted by a user to a first position at which the first object does not overlap with the second object and (iii) then is shifted again by the user to a second position at which the first object overlaps with the second object, (iv) the change unit executes processing to change the first drawing order such that the first object is arranged behind the second object,
wherein, when (i) the first object is arranged in a second drawing order behind the second object to overlap the second object and (ii) is shifted by the user to a first position at which the first object does not overlap with the second object and (iii) then is shifted again by the user to a second position at which the first object overlaps with the second object, (iv) the change unit executes processing to change the second drawing order such that the first object is arranged in front of the second object,
and wherein, when (i) the first object is shifted by the user to a first position at which the first object overlaps with the second object and (ii) then is shifted again by the user to a second position at which the first object overlaps with the second object, (iii) the change unit refrains from executing processing to change the drawing order of the group of objects.

2. The information processing apparatus according to claim 1, wherein the first object is shifted as part of the change-target object shift operation according to a drag-and-drop operation by the user, where the user drags the first object to the first position and then to the second position and then completes the change-target object shift operation by dropping the first object.

3. The information processing apparatus according to claim 1,
 wherein, when the user selects a first predetermined mode, the change unit refrains from executing processing to change the drawing order of the group of objects in response to a shifting of the first object relative to a remainder of the group of objects and,
 wherein, when the user selects a second predetermined mode, the change unit executes processing to change the drawing order of the group of objects in response to a shifting of the first object relative to a remainder of the group of objects.

4. The information processing apparatus according to claim 1, wherein the change unit automatically executes processing to change a drawing order of the group of objects in response to two objects in the group of objects, which initially overlap, being separated to no longer overlap and then returned to overlap each other.

5. The information processing apparatus according to claim 1, wherein the selection unit is configured to select the first object as a target to be shifted within a two-dimensional space relative to a remainder of the group of objects displayed on the display apparatus, and the change unit is configured to execute processing to change the drawing order of the group of objects in a third-dimensional space away from the two-dimensional space.

6. The information processing apparatus according to claim 1, wherein the display unit further is configured to display, on the display apparatus, a user interface having an item that, when selected by the user, switches a depth change mode to a mode in which the change unit is configured to change depth position information of an object from a first depth position to at least a second depth position in response to the user moving an object along a surface at the first depth position during the change-target object shift operation.

7. A method for an information processing apparatus, the method comprising:
 displaying, on a display apparatus, a group of objects having a first object and a second object, wherein at least a part of the first object and at least a part of the second object are overlapped;
 selecting, from the displayed group of objects displayed on the display apparatus, the first object as a target to be shifted; and
 executing processing, as a change-target object shift operation, using a processor, to change a drawing order of the group of objects,
 wherein, when (i) the first object is arranged in a first drawing order in front of the second object to overlap the second object and (ii) is shifted by a user to a first position at which the first object does not overlap with the second object and (iii) then is shifted again by the user to a second position at which the first object overlaps with the second object, (iv) executing processing includes changing the first drawing order such that the first object is arranged behind the second object,
 wherein, when (i) the first object is arranged in a second drawing order behind the second object to overlap the second object and (ii) is shifted by the user to a first position at which the first object does not overlap with the second object and (iii) then is shifted again by the user to a second position at which the first object overlaps with the second object, (iv) executing processing includes changing the second drawing order such that the first object is arranged in front of the second object, and
 wherein, when (i) the first object is shifted by the user to a first position at which the first object overlaps with the second object and (ii) then is shifted again by the user to a second position at which the first object overlaps with the second object, (iii) executing processing includes refraining from executing processing to change the drawing order of the group of objects.

8. The method according to claim 7, wherein the first object is shifted as part of the change-target object shift operation according to a drag-and-drop operation by the user, where the user drags the first object to the first position and then to the second position and then completes the change-target object shift operation by dropping the first object.

9. The method according to claim 7,
 wherein, when the user selects a first predetermined mode, executing processing includes refraining from executing processing to change the drawing order of the group of objects in response to a shifting of the first object relative to a remainder of the group of objects and,
 wherein, when the user selects a second predetermined mode, executing processing includes changing the drawing order of the group of objects in response to a shifting of the first object relative to a remainder of the group of objects.

10. A non-transitory computer-readable storage medium storing a program to cause an information processing apparatus to perform a method, the method comprising:
 displaying, on a display apparatus, a group of objects having a first object and a second object, wherein at least a part of the first object and at least a part of the second object are overlapped;
 selecting, from the displayed group of objects displayed on the display apparatus, the first object as a target to be shifted; and executing processing, as a change-target object shift operation, using a processor, to change a drawing order of the group of objects,
 wherein, when (i) the first object is arranged in a first drawing order in front of the second object to overlap the second object and (ii) is shifted by a user to a first position at which the first object does not overlap with the second object and (iii) then is shifted again by the user to a second position at which the first object overlaps with the second object, (iv) executing processing includes changing the first drawing order such that the first object is arranged behind the second object,
 wherein, when (i) the first object is arranged in a second drawing order behind the second object to overlap the second object and (ii) is shifted by the user to a first position at which the first object does not overlap with the second object and (iii) then is shifted again by the user to a second position at which the first object overlaps with the second object, (iv) executing processing includes changing the second drawing order such that the first object is arranged in front of the second object, and
 wherein, when (i) the first object is shifted by the user to a first position at which the first object overlaps with the second object and (ii) then is shifted again by the user to a second position at which the first object overlaps with the second object, (iii) executing processing includes refraining from executing processing to change the drawing order of the group of objects.

11. The non-transitory computer-readable storage medium according to claim 10, wherein the first object is shifted as part of the change-target object shift operation according to a drag-and-drop operation by the user, where the user drags the first object to the first position and then to the second position and then completes the change-target object shift operation by dropping the first object.

12. The non-transitory computer-readable storage medium according to claim 11,
- wherein, when the user selects a first predetermined mode, executing processing includes refraining from executing processing to change the drawing order of the group of objects in response to a shifting of the first object relative to a remainder of the group of objects and,
- wherein, when the user selects a second predetermined mode, executing processing includes changing the drawing order of the group of objects in response to a shifting of the first object relative to a remainder of the group of objects.

\* \* \* \* \*